(12) United States Patent
Corley et al.

(10) Patent No.: US 10,470,143 B2
(45) Date of Patent: Nov. 5, 2019

(54) SYSTEMS AND METHODS FOR TIMING SYNCHRONIZATION AND SYNCHRONIZATION SOURCE SELECTION FOR VEHICLE-TO-VEHICLE COMMUNICATIONS

(71) Applicant: QUALCOMM INCORPORATED, San Diego, CA (US)

(72) Inventors: Michael Corley, Boulder, CO (US); Arvind Vardarajan Santhanam, San Diego, CA (US); Scott Hoover, Del Mar, CA (US); Aamod Khandekar, San Diego, CA (US); Subramanya Rao, Sunnyvale, CA (US); Prabhu Kandasamy, San Diego, CA (US); Alexandre Pierrot, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/919,622

(22) Filed: Mar. 13, 2018

(65) Prior Publication Data
US 2019/0289561 A1    Sep. 19, 2019

(51) Int. Cl.
*H04W 56/00* (2009.01)
*H04W 4/46* (2018.01)
(Continued)

(52) U.S. Cl.
CPC ........ *H04W 56/001* (2013.01); *H04B 1/7083* (2013.01); *H04B 1/70735* (2013.01);
(Continued)

(58) Field of Classification Search
CPC . H04W 56/001; H04W 4/46; H04W 72/0446; H04W 72/087; H04W 4/44;
(Continued)

(56) References Cited

U.S. PATENT DOCUMENTS 7,877,104 B2   1/2011  Turetzky et al.
8,849,302 B2   9/2014  Siomina et al.
(Continued)

FOREIGN PATENT DOCUMENTS

GB      2452688 A       3/2009
WO   2017033486 A1      3/2017
(Continued)

OTHER PUBLICATIONS

Manolakis et al., "Time Synchronization for Multi-Link D2D/V2X Communication", 2016, IEEE, 2016 IEEE 84th Vehicular Technology Conference (2016) (Year: 2016).*

(Continued)

*Primary Examiner* — Brian T O Connor
(74) *Attorney, Agent, or Firm* — Smith Tempel Blaha LLC

(57) ABSTRACT

A method for communication includes obtaining a timing signal from a timing synchronization reference source, computing a system frame number (SFN)—direct frame number (DFN) offset, creating a timing fingerprint using the timing signal and the SFN-DFN offset, the timing fingerprint also comprising additional timing information, entering the timing fingerprint into a database, continually updating the timing fingerprint, determining whether the timing signal remains within a threshold, if the timing signal exceeds the threshold, iterating the timing fingerprint, verifying the timing fingerprint to determine whether there is a timing inconsistency between a most recent timing fingerprint and current time, if the timing fingerprint is verified, using the SFN-DFN offset to derive current DFN timing to decode a sidelink control information (SCI) communication, and if the SCI communication is decoded, using the timing signal for communicating over a sidelink communication channel.

30 Claims, 17 Drawing Sheets

(51) Int. Cl.
*H04B 1/7073* (2011.01)
*H04W 72/04* (2009.01)
*H04B 1/7083* (2011.01)
*G08G 1/16* (2006.01)
*H04W 4/44* (2018.01)
*H04W 72/08* (2009.01)

(52) U.S. Cl.
CPC ......... *H04W 4/46* (2018.02); *H04W 72/0446* (2013.01); *G08G 1/163* (2013.01); *H04B 2201/7073* (2013.01); *H04W 4/44* (2018.02); *H04W 56/0045* (2013.01); *H04W 72/08* (2013.01); *H04W 72/087* (2013.01)

(58) Field of Classification Search
CPC .............. H04W 72/08; H04W 56/0045; H04B 1/7083; H04B 1/70735; H04B 2201/7073; G08G 1/163
See application file for complete search history.

(56) References Cited

U.S. PATENT DOCUMENTS

| | | | |
|---|---|---|---|
| 9,877,350 B2 * | 1/2018 | Abdallah | H04B 7/0617 |
| 2009/0156195 A1 * | 6/2009 | Humblet | H04W 56/001 |
| | | | 455/422.1 |
| 2016/0095074 A1 | 3/2016 | Park et al. | |
| 2018/0199296 A1 * | 7/2018 | Peroulas | H04W 24/02 |
| 2018/0213438 A1 * | 7/2018 | Muraoka | H04W 28/06 |

FOREIGN PATENT DOCUMENTS

| | | | | |
|---|---|---|---|---|
| WO | WO-2018059700 A1 * | 4/2018 | ............ | H04W 76/14 |
| WO | WO-2018059701 A1 * | 4/2018 | ........ | H04W 36/0058 |
| WO | WO-2018184688 A1 * | 10/2018 | ........ | H04W 56/0015 |
| WO | WO-2019034252 A1 * | 2/2019 | ............ | G01S 1/045 |

OTHER PUBLICATIONS

ZTE: "CR on V2X Miscellaneous RRC Corrections", 3GPP TR 36.331, R2-1704626, Change Request, CR2820, Release 14, Version 14.2.2, May 2017, pp. 1-17.

Huawei Hisilicon: "Discussion on DFN Offset", 3GPP Draft; R2-167925 Discussion on DFN Offset, 3rd Generation Partnership Project (3GPP), Mobile Competence Centre, 650, Route Des Lucioles; F-06921 Sophia-Antipolis Cedex, France, vol. RAN WG2, No. Reno, USA; 20161114-20161118, Nov. 13, 2016 (Nov. 13, 2016), pp. 1-3, XP051177660, Retrieved from the Internet: URL: http://www.3gpp.org/flp/Meetings_3GPP_SYNC/RAN2/Docs/ [retrieved on Nov. 13, 2016].

International Search Report and Written Opinion—PCT/US2019/021069—ISA/EPO—May 21, 2019.

\* cited by examiner

1200 →

| | Field | Size (bits) | Optional | Description |
|---|---|---|---|---|
| 1212 | Synchronization Reference Source | | No | Source of timing reference |
| 1214 | Synchronization Source Priority | | Yes | Priority assigned to the source |
| 1216 | SFN-DFN offset | | No | Offset in Ts between the eNB SFN#0 and GNSS derived DFN#0 |
| 1218 | Source Time Uncertainty | | No | Uncertainty of sync source when offset computed |
| 1222 | UTC Timestamp | | No | Timestamp from sync source |
| 1224 | Local Clock Timestamp | | Yes | Timestamp from local clock |
| 1226 | eNB Cell ID | | No | Cell ID of the eNB |
| 1228 | GNSS position | | Yes | Lat/Long/Elevation |
| 1232 | Timing Advance (TA) | | Yes | Timing Advance value |

SYSTEMS AND METHODS FOR TIMING SYNCHRONIZATION AND SYNCHRONIZATION SOURCE SELECTION FOR VEHICLE-TO-VEHICLE COMMUNICATIONS

TECHNICAL FIELD

The present disclosure relates to wireless communication systems, and more particularly to establishing and maintaining timing synchronization for device-to-device communications. Certain embodiments enable and provide communication techniques that can include establishing and maintaining timing synchronization and synchronization source selection for vehicle-to-vehicle communications.

INTRODUCTION

Wireless communications devices, sometimes referred to as user equipment (UE), may communicate with a base station or may communicate directly with another UE. When a UE communicates directly with another UE, the communication is referred to as device-to-device (D2D) communication. In particular use cases, a UE may be a wireless communication device, such as a portable cellular device, or may be a vehicle, such as an automobile, or may be any other connected device.

When the UE is a vehicle, such as an automobile, the D2D communication may be referred to as vehicle-to-vehicle (V2V) communication. Other vehicle-based UE communications may include vehicle-to-everything (V2X), which may include V2V, vehicle-to-infrastructure (V2I), vehicle-to-network (V2N), and vehicle-to-pedestrian (V2P). Vehicle-to-everything (V2X) communications and particularly, V2V communications will become more and more important in the future for collision avoidance and autonomous driving.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for communication. Method embodiments can include obtaining a timing signal from a timing synchronization reference source, computing a system frame number (SFN)-direct frame number (DFN) offset, creating a timing fingerprint using the timing signal and the SFN-DFN offset, the timing fingerprint also comprising additional timing information, entering the timing fingerprint into a database, continually updating the timing fingerprint, determining whether the timing signal remains within a threshold, if the timing signal exceeds the threshold, iterating the timing fingerprint, verifying the timing fingerprint to determine whether there is a timing inconsistency between a most recent timing fingerprint and current time, if the timing fingerprint is verified, using the SFN-DFN offset to derive current DFN timing to decode a sidelink control information (SCI) communication, and if the SCI communication is decoded, using the timing signal for communicating over a sidelink communication channel.

Another aspect of the disclosure provides an apparatus for communication comprising a user equipment (UE) configured to obtain a timing signal from a timing synchronization reference source, the UE configured to compute a system frame number (SFN)-direct frame number (DFN) offset, the UE configured to create a timing fingerprint using the timing signal and the SFN-DFN offset, the timing fingerprint also comprising additional timing information, a database configured to store the timing fingerprint, the UE configured to continually update the timing fingerprint, the UE configured to determine whether the timing signal remains within a threshold, if the timing signal exceeds the threshold, the UE configured to iterate the timing fingerprint, the UE configured to verify the timing fingerprint to determine whether there is a timing inconsistency between a most recent timing fingerprint and current time, if the timing fingerprint is verified, the UE configured to use the SFN-DFN offset to derive current DFN timing to decode a sidelink control information (SCI) communication, and if the SCI communication is decoded, the UE configured to use the timing signal for communicating over a sidelink communication channel.

Another aspect of the disclosure provides a device including means for obtaining a timing signal from a timing synchronization reference source, means for computing a system frame number (SFN)-direct frame number (DFN) offset, means for creating a timing fingerprint using the timing signal and the SFN-DFN offset, the timing fingerprint also comprising additional timing information, means for entering the timing fingerprint into a database, means for continually updating the timing fingerprint, means for determining whether the timing signal remains within a threshold, if the timing signal exceeds the threshold, means for iterating the timing fingerprint, means for verifying the timing fingerprint to determine whether there is a timing inconsistency between a most recent timing fingerprint and current time, if the timing fingerprint is verified, means for using the SFN-DFN offset to derive current DFN timing to decode a sidelink control information (SCI) communication, and if the SCI communication is decoded, means for using the timing signal for communicating over a sidelink communication channel.

Another aspect of the disclosure provides a non-transitory computer-readable medium storing computer executable code for communication, the code executable by a processor to obtain a timing signal from a timing synchronization reference source, compute a system frame number (SFN)-direct frame number (DFN) offset, create a timing fingerprint using the timing signal and the SFN-DFN offset, the timing fingerprint also comprising additional timing information, enter the timing fingerprint into a database, continually update the timing fingerprint, determine whether the timing signal remains within a threshold, if the timing signal exceeds the threshold, iterate the timing fingerprint, verify the timing fingerprint to determine whether there is a timing inconsistency between a most recent timing fingerprint and current time, if the timing fingerprint is verified, use the SFN-DFN offset to derive current DFN timing to decode a sidelink control information (SCI) communication, and if the SCI communication is decoded, use the timing signal for communicating over a sidelink communication channel.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 12 is a diagram showing a timing fingerprint database entry in accordance with various aspects of the present disclosure.

DETAILED DESCRIPTION

Figure 1:
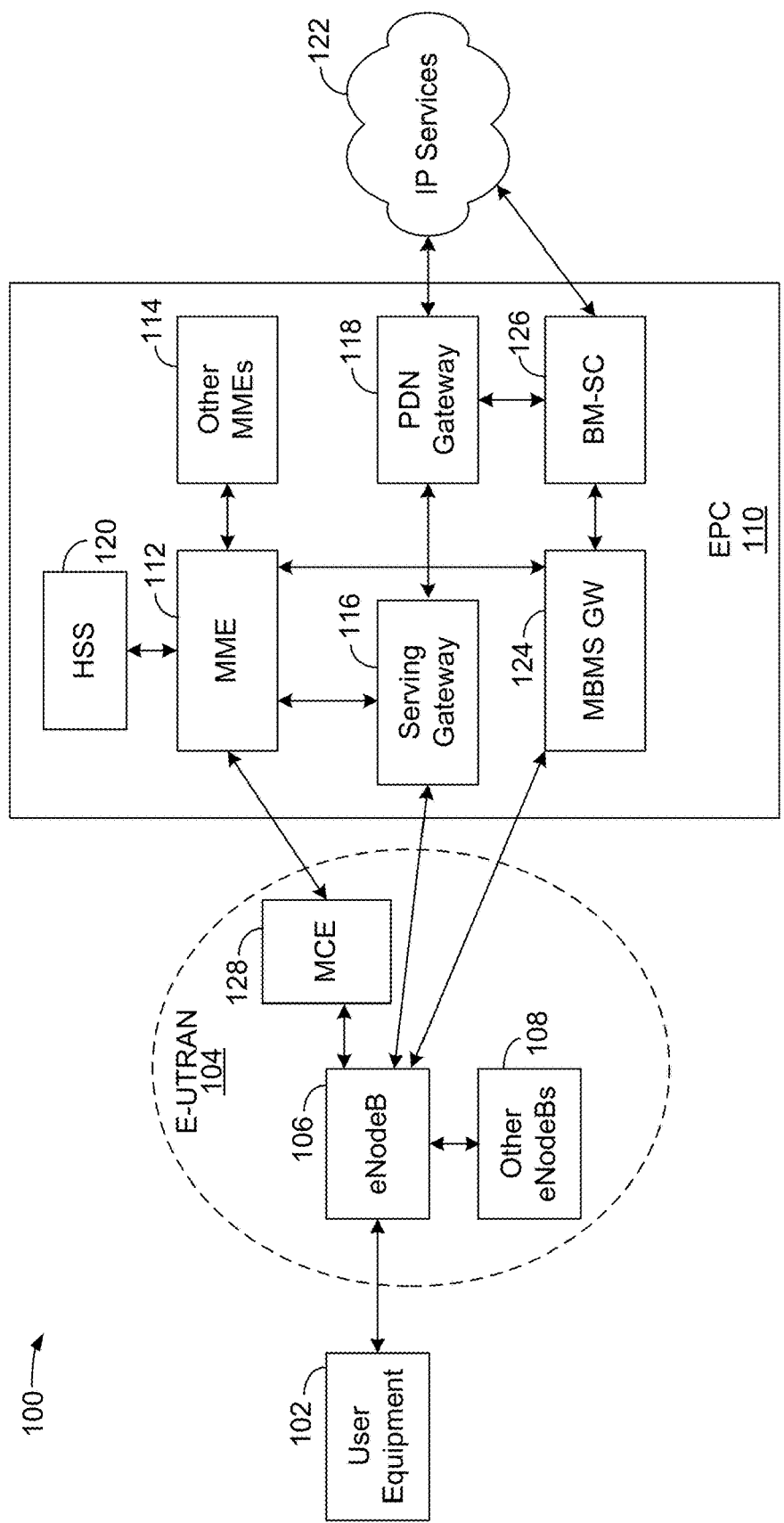
FIG. 1 is a diagram illustrating an example of a network architecture, in accordance with various aspects of the present disclosure.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Exemplary embodiments of the disclosure are directed to device-to-device (D2D) and, more particularly, vehicle-to-vehicle (V2V) and vehicle-to-everything (V2X) communication in which certain embodiments enable and provide communication techniques that can include establishing and maintaining timing synchronization and synchronization source selection for vehicle-to-vehicle communications.

As used herein, the term "NR" refers to "new radio" which is a way of referring to a radio interface that may be part of the 5G communication methodology. The term "NR" can be used interchangeably with the term "5G."

Certain radio resources can be used for direct vehicle to vehicle (V2V) or vehicle-to-everything (V2X) communication. These resources are generally referred to as "sidelink" resources and may be used to communicate over a "sidelink channel." A sidelink channel is a communication channel that does not use a base station to relay communication between and among UEs. For V2V or V2X communications, it is important for the UEs to establish and maintain timing synchronization with each other.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services; however, as those skilled in the art will readily appreciate, the various concepts presented throughout this disclosure may be extended to networks providing circuit-switched services.

The E-UTRAN 104 includes a base station, such as, for example the evolved Node B (eNB) 106 and other eNBs 108, which may include a gNodeB (gNB) a Home NodeB, a Home eNodeB, or a base station using some other suitable terminology. For example, in a 5G or New Radio (NR) network, a base station may be referred to as a gNB. The E-UTRAN 104 may also include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, a drone, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, drone, vehicle, industrial equipment, medical equipment, wearable, entertainment device, recreational device, mammal implantable device, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
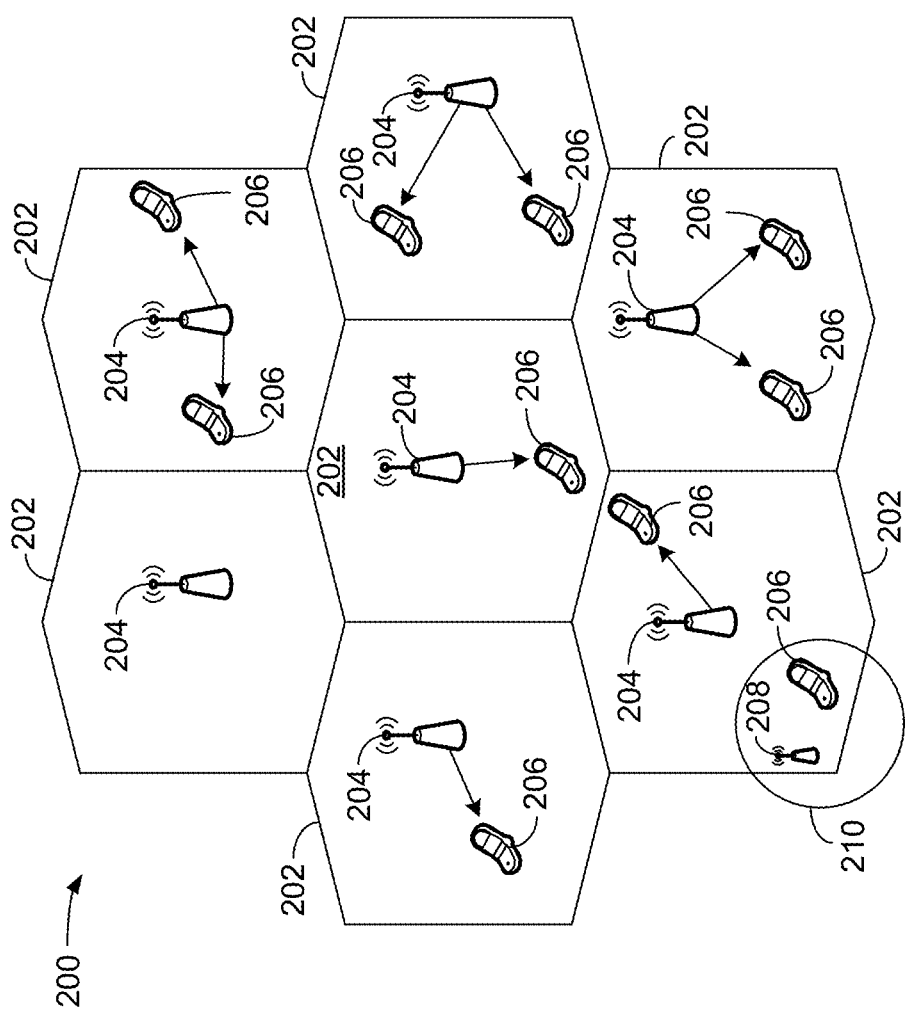
FIG. 2 is a diagram illustrating an example of an access network, in accordance with various aspects of the present disclosure.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "gNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO), Ultra Mobile Broadband (UMB), 5G, or other modulation and multiple access techniques. EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-PDMA in the form of a DFT-spread OFDM signal to compensate for high peak-to-average power ratio (PAPR).

Figure 3:
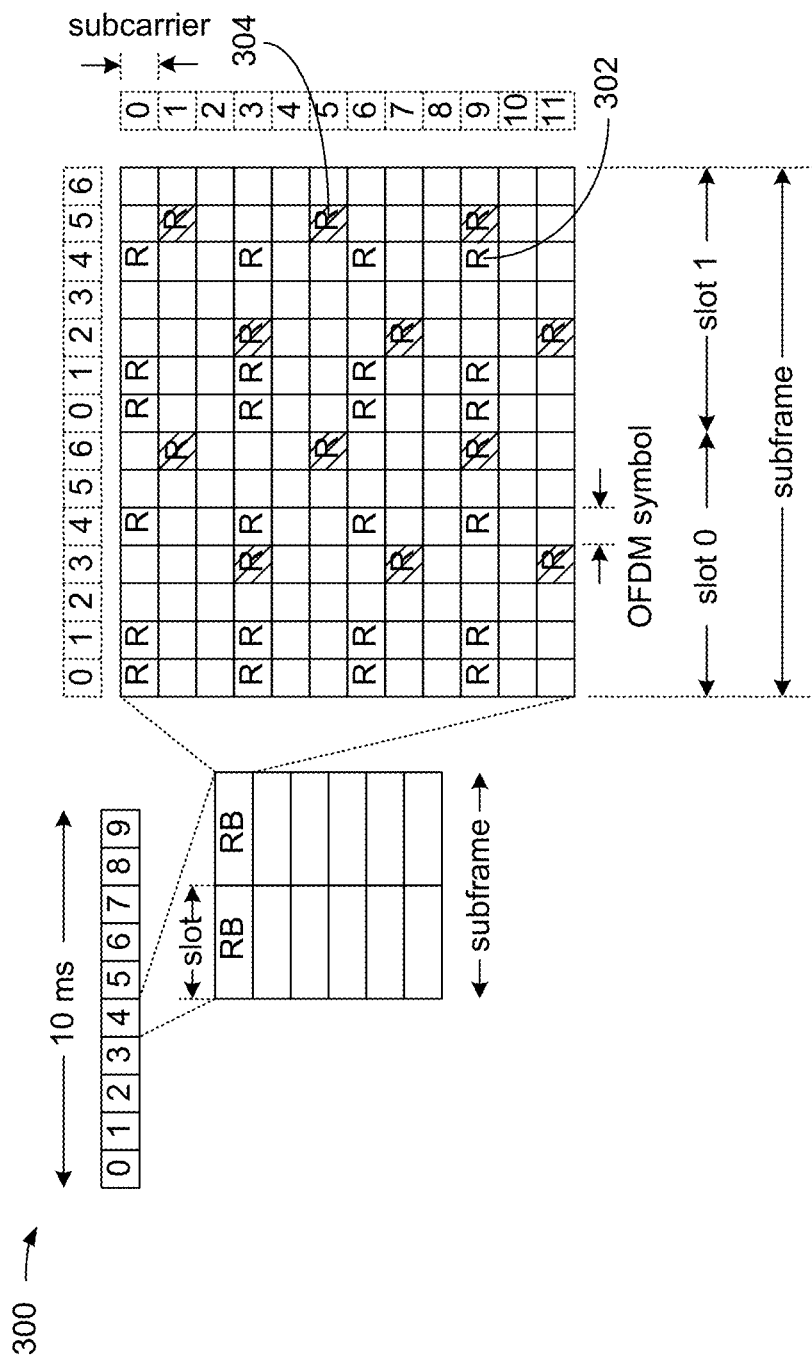
FIG. 3 is a diagram illustrating an example of a DL frame structure in LTE, in accordance with various aspects of the present disclosure.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. In other exemplary communication systems, such as, for example, a 5G or a NR communication system, other numbers of subcarriers in the frequency domain and symbols in the time domain, providing other numbers of resource elements are possible. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
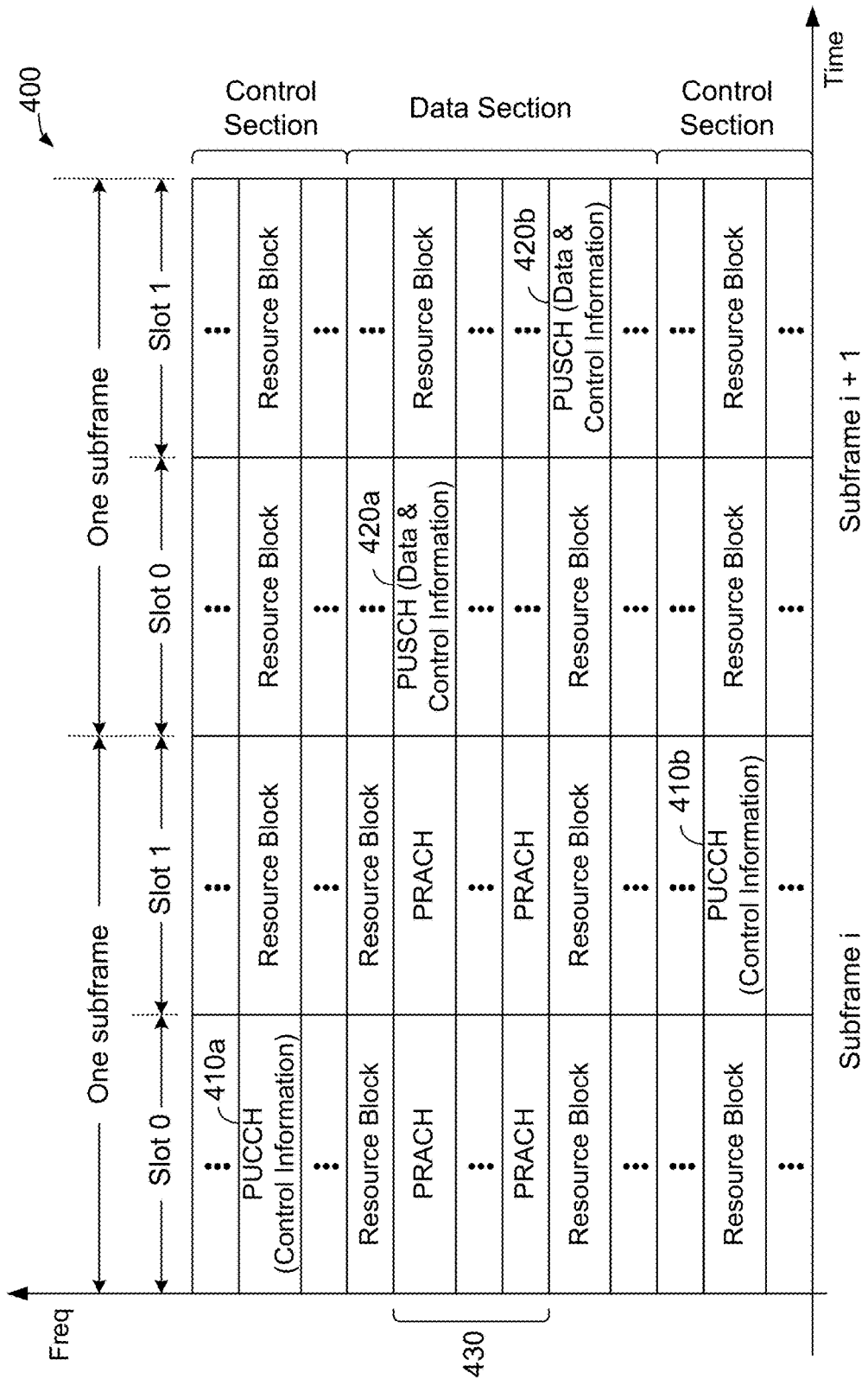
FIG. 4 is a diagram illustrating an example of an UL frame structure in LTE, in accordance with various aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
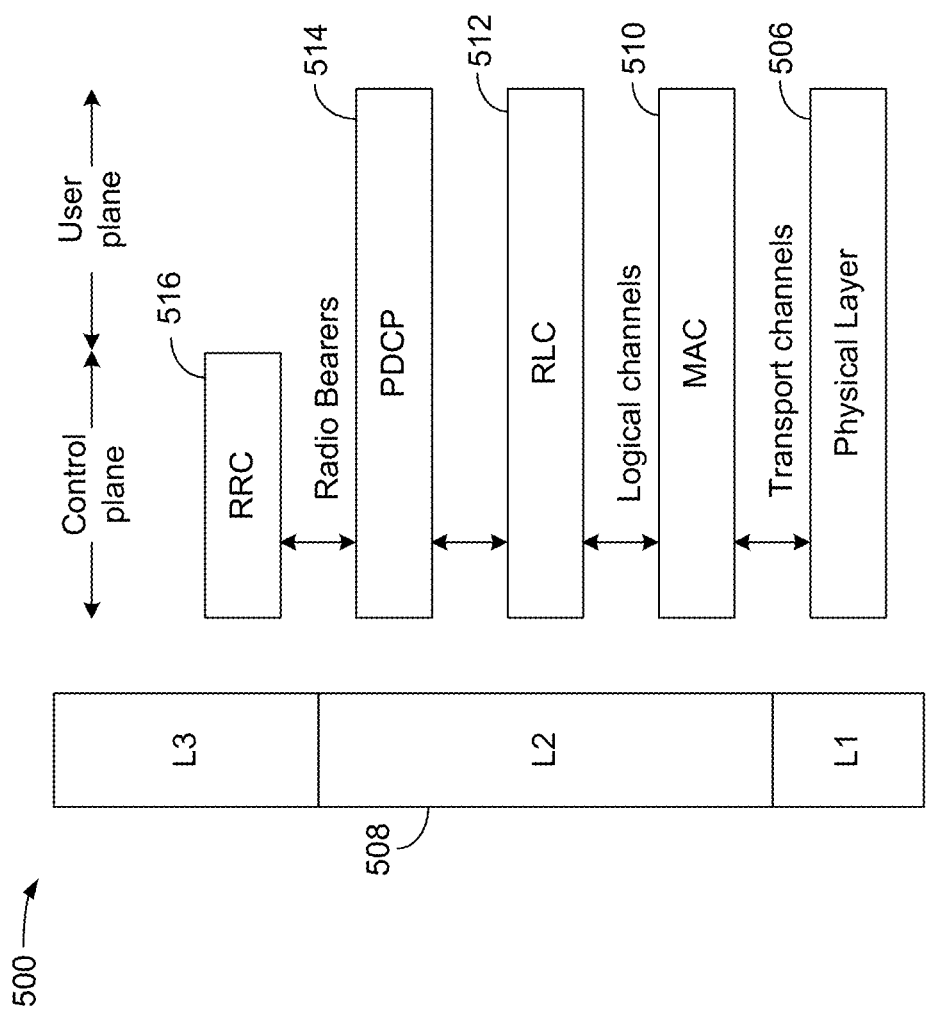
FIG. 5 is a diagram illustrating an example of a radio protocol architecture for the user and control planes in accordance with various aspects of the present disclosure.

FIG. 5 is a diagram 500 illustrating an example of a radio protocol architecture for the user and control planes in LTE in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
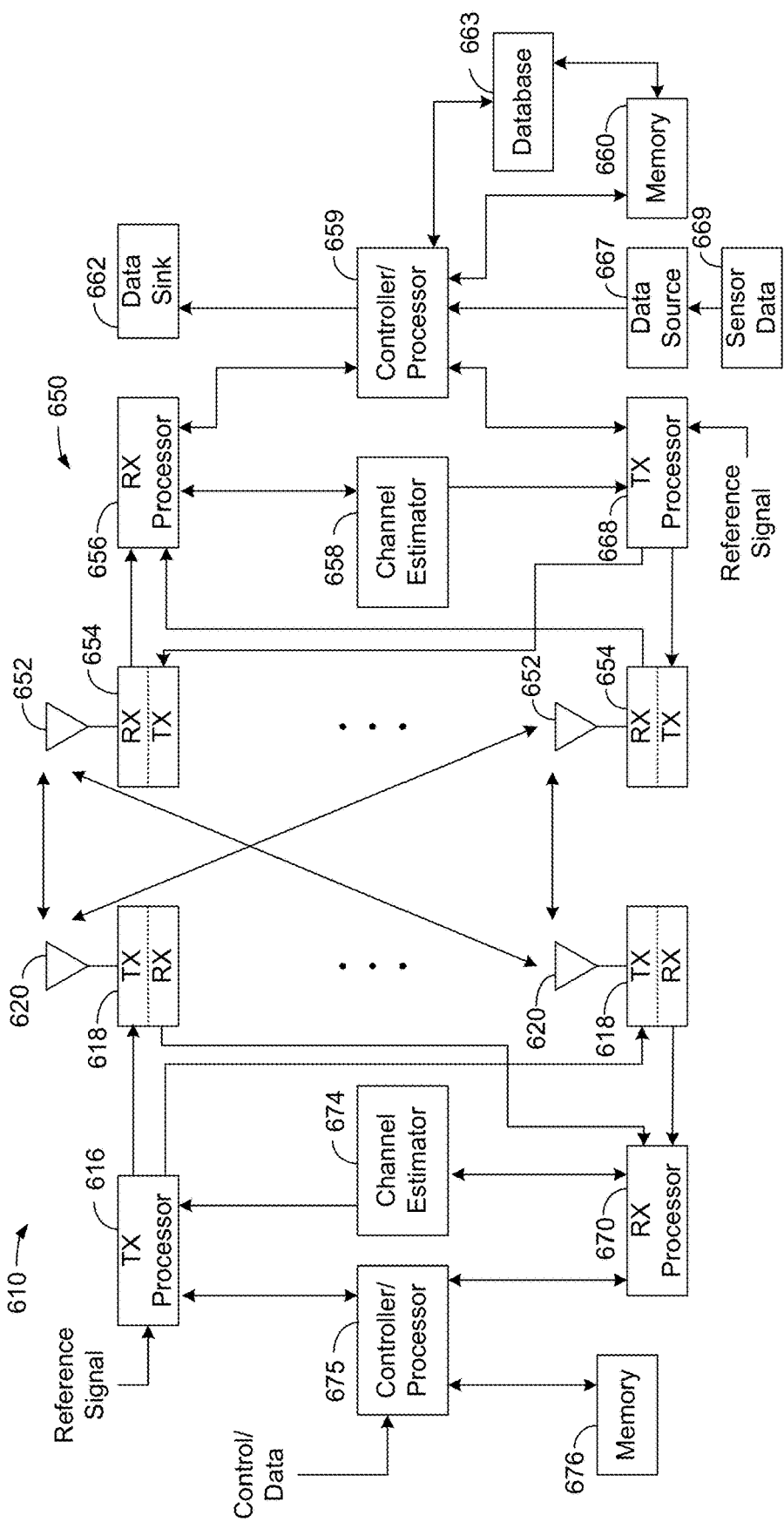
FIG. 6 is a diagram illustrating an example of an evolved Node B and user equipment in an access network in accordance with various aspects of the present disclosure.

FIG. 6 is a block diagram of an eNB 610 in communication with a UE 650 in an access network in accordance with various aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In an exemplary embodiment, the controller/processor 659 and the memory 660 may be in operative communication with one or more databases, with an exemplary database 663 shown for illustrative purposes only. In an exemplary embodiment, the database 663 may store timing synchronization and timing source information, and in an exemplary embodiment, may store one or more "timing fingerprints" having information related to timing synchronization, timing synchronization sources, and other timing synchronization related information. Although shown as a separate element in FIG. 6, the database 663 may be part of the memory 660.

Figure 7:
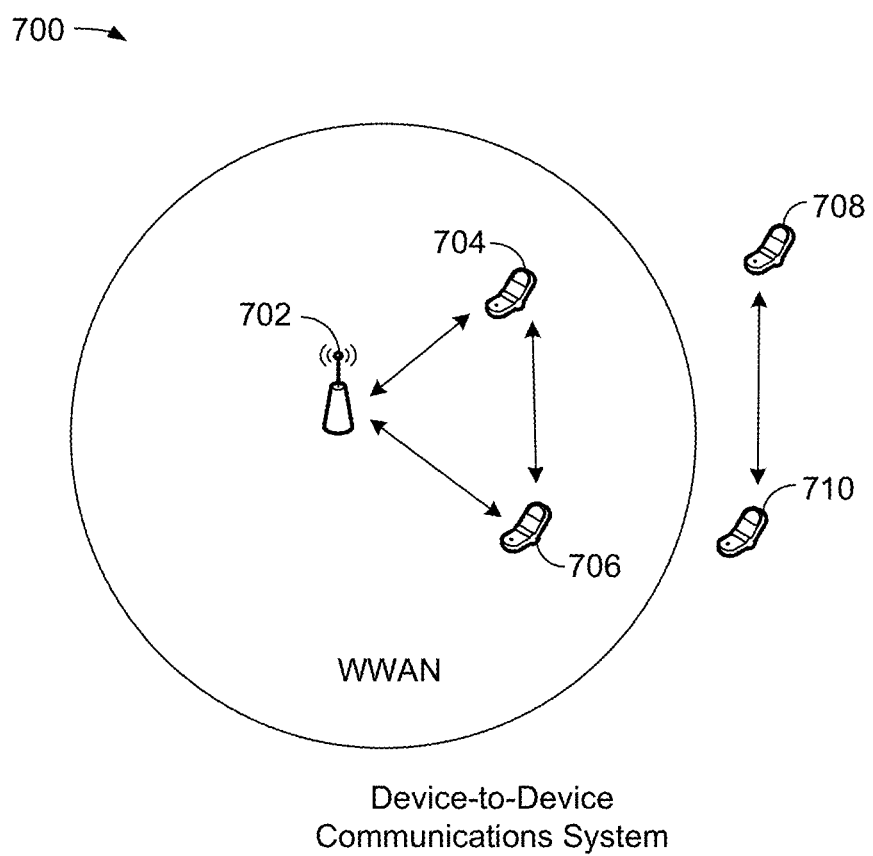
FIG. 7 is a diagram of a device-to-device communications system in accordance with various aspects of the present disclosure.

FIG. 7 is a diagram of a device-to-device (D2D) communications system 700 in accordance with various aspects of the present disclosure. The device-to-device communications system 700 may be implemented by the network shown in FIG. 1, and, in an exemplary embodiment, includes a plurality of wireless devices 704, 706, 708, 710. The device-to-device communications system 700 may overlap with a cellular communications system (as shown and described in FIG. 1 and FIG. 2), such as for example, a wireless wide area network (WWAN). Some of the wireless devices 704, 706, 708, 710 may communicate together in device-to-device (or peer-to-peer) communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

In one configuration, some or all of the UEs 704, 706, 708, 710 may be equipped or located on vehicles. In such a configuration, the D2D communications system 700 may also be referred to as a vehicle-to-vehicle (V2V) communications system.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. Yet one of ordinary skill in the art would understand that the exemplary methods and apparatuses are applicable more generally to a variety of other wireless device-to-device communication systems or communication networks such as 5G and beyond.

In wireless networks, such as an LTE network, or a NR (5G) network, some UEs may know their location while other UEs may not. In an exemplary embodiment, UEs that know their location may determine their location using global positioning system (GPS) technology. In another exemplary embodiment, UEs may have a fixed location that is preconfigured. UEs that do not know their location may lack GPS or may be in an indoor environment. In some instances, UEs that do not know their location may determine their position or location using signals received from a base station. Positioning and locating using base station signaling; however, may be inaccurate because the distance from the base station to the UE may be difficult to estimate accurately due to a lack of a direct path (e.g., non-line-of-sight) between the base station and the UE. As such, the error in estimation may be significant (e.g., 50 meters or more).

In an exemplary embodiment, a UE that does not know its location may determine its location from UEs that know their location using D2D positioning. D2D positioning through D2D signaling may be performed using device-to-device ranging, including, for example, techniques such as time of arrival (TOA) or time difference of arrival (TDOA). A UE may determine its position using TOA/TDOA and the known positions of proximate UEs.

Figure 8:
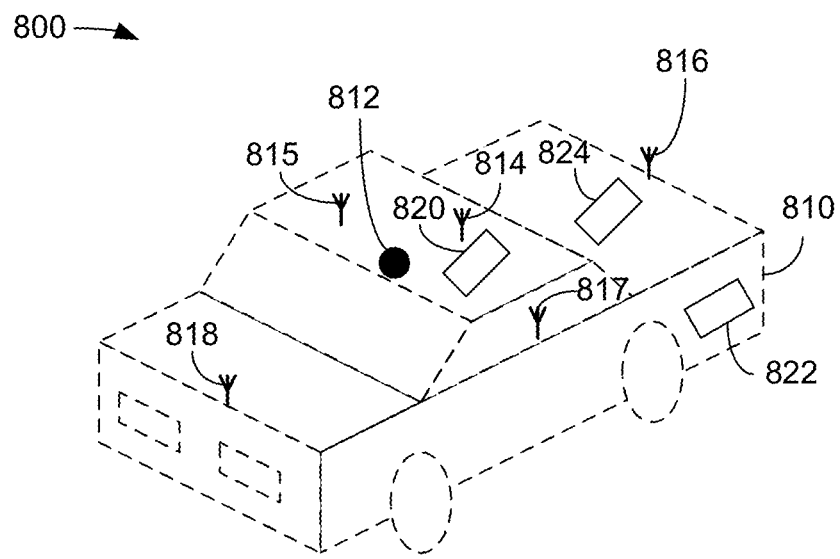
FIG. 8 is a schematic diagram illustrating a vehicle for use in device-to-device communications, in accordance with various aspects of the present disclosure.

FIG. 8 is a schematic diagram 800 illustrating a vehicle for use in device-to-device communications, in accordance with various aspects of the present disclosure. In an exemplary embodiment, the device in FIG. 8 can be a UE and can be located on, located in, or can comprise a vehicle 810. While an automobile is shown as the vehicle 810 in FIG. 8, the UE can comprise other vehicles, such as, a truck, a drone, or any other vehicle. In an exemplary embodiment, the vehicle 810 may comprise a GPS antenna 812, and one or more radio frequency (RF) antennas. In an exemplary embodiment, the vehicle 810 may comprise RF antennas 814, 815, 816, 817 and 818, configured to perform vehicle-to-vehicle (V2V) ranging and communication, vehicle-to-everything (V2X) ranging and communication, or other vehicle ranging, or communication operations. However, the vehicle 810 may comprise more or fewer RF antennas. The GPS antenna 812 may be in operative communication with one or more GPS satellites. The RF antennas 814, 815, 816, 817 and 818 may be in operative communication with one or more base stations (for example, one or more eNBs), one or more UEs, or one or more other stationary or mobile devices.

Figure 9:
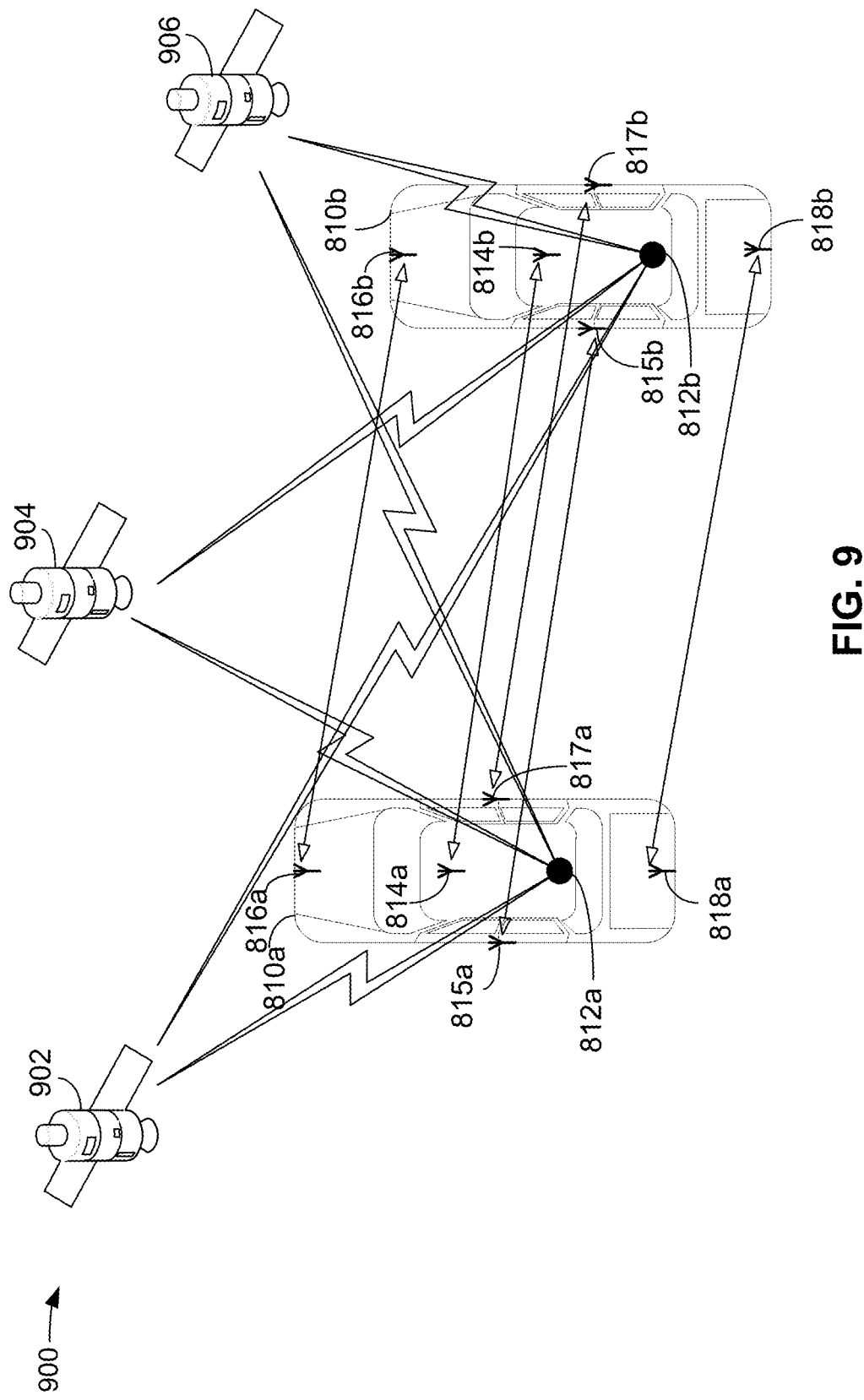
FIG. 9 is a schematic diagram illustrating a V2V communication system, in accordance with various aspects of the present disclosure.

FIG. 9 is a schematic diagram illustrating a V2V communication system, in accordance with various aspects of the present disclosure. The communication system 900 comprises GPS satellites 902, 904 and 906 in communication with two vehicles, a first vehicle 810a and a second vehicle 810b. Although only two vehicles are shown in FIG. 9, it should be understood that there may be more or fewer vehicles in such a communication system. The first vehicle 810a may comprise a GPS antenna 812a, and one or more radio frequency (RF) antennas. In an exemplary embodiment, the first vehicle 810a may comprise RF antennas 814a, 815a, 816a, 817a and 818a. In an exemplary embodiment, the first vehicle 810a may be an embodiment of the vehicle 810 of FIG. 8.

The second vehicle 810b may comprise a GPS antenna 812b, and one or more radio frequency (RF) antennas. In an exemplary embodiment, the second vehicle 810b may comprise RF antennas 814b, 815b, 816b, 817b and 818b. The RF antenna 818b may be located on the rear edge of the second vehicle 810b. In an exemplary embodiment, the second vehicle 810b may be an embodiment of the vehicle 810 of FIG. 8.

In an exemplary embodiment, the first vehicle 810a and the second vehicle 810b may be in operative communication with one or more of GPS satellites 902, 904 and 906.

Although three GPS satellites are shown in FIG. 9, more or fewer GPS satellites may be in operative communication with the first vehicle 810a and the second vehicle 810b. In an exemplary embodiment, the GPS antenna 812a on the first vehicle 810a generates a GPS location. Similarly, the GPS antenna 812b on the second vehicle 810b generates a GPS location. In an exemplary embodiment, the GPS satellites 902, 904 and 906 may provide a GNSS (global navigation satellite system) timing reference to the vehicle 810a and the vehicle 810b.

In an exemplary embodiment, any of the RF antennas 814a, 815a, 816a, 817a and 818a can be configured to transmit to any of the antennas on the second vehicle 810b. Similarly, any of the RF antennas 814b, 815b, 816b, 817b and 818b can be configured to transmit to any of the antennas on the first vehicle 810a.

Although illustrated as an automobile, the vehicle 810 may be other types of vehicles, such as, for example, a drone, a manned or an unmanned aerial vehicle, a remote controlled vehicle, or any other vehicle.

Figure 10:
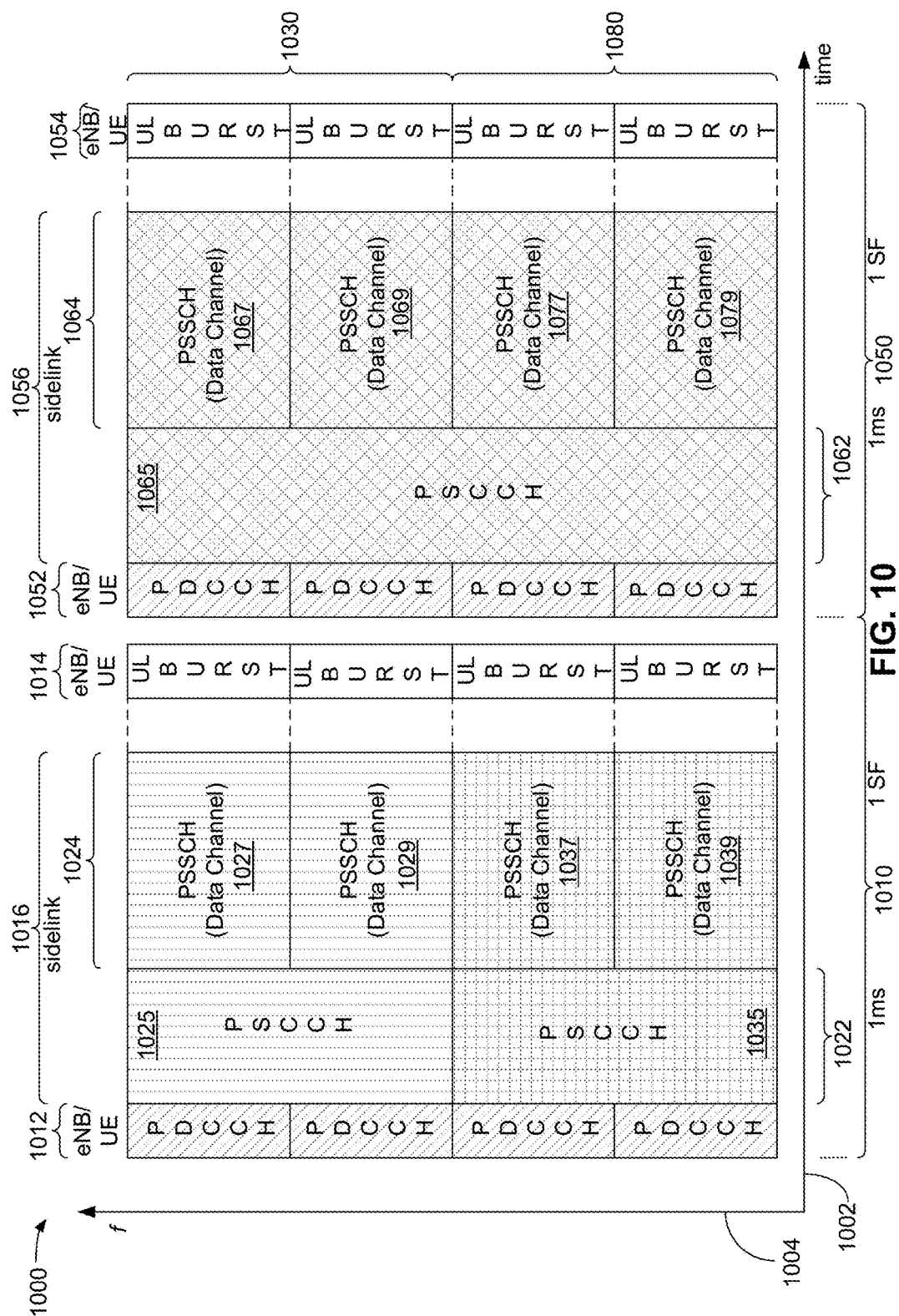
FIG. 10 is a diagram illustrating an example of a frame structure, in accordance with various aspects of the present disclosure.

FIG. 10 is a diagram illustrating an example of a communication frame structure 1000, in accordance with various aspects of the present disclosure. In an exemplary embodiment, the communication frame structure 1000 comprises a subframe 1010 and a subframe 1050. However, it should be understood that two subframes are shown for convenience only. Typically, many more subframes will be part of a communication frame structure.

The subframe 1010 and the subframe 1050 generally comprise a period of time and a set of frequencies that define a number of different resources, sometimes referred to as resource blocks, or radio resources.

In an exemplary embodiment, the subframe 1010 and the subframe 1050 may each occur over a time period of 1 millisecond (ms). However, the duration of a subframe is dependent upon a number of different parameters, and may be shorter or longer, depending on implementation. In an exemplary embodiment, the subframe 1010 and the subframe 1050 may be divided into what can be referred to as "sub channels." For example, certain frequency portions of the subframe 1010 and the subframe 1050 may comprise a sub-channel 1030 and certain frequency portions of the subframe 1010 and the subframe 1050 may comprise a sub-channel 1080. The sub-channels 1030 and 1080 are shown for illustrative purposes only as occupying one half of the frequency resources of the frame structure 1000. The sub-channels 1030 and 1080 are optional, and, if present, may occupy more of less of the frequency resources shown. Further, more than two sub-channels may occupy the frequency resources shown.

In an exemplary embodiment, the subframe 1010 may comprise a number of different communication channels that occupy a number of resources, both in time and in frequency. Time is shown on the horizontal axis 1002 increasing to the right and frequency is shown on the vertical axis 1004 increasing upward.

In an exemplary embodiment, the subframe 1010 may comprise a 5G physical downlink control channel (PDCCH) 1012 and an uplink channel 1014. In an exemplary embodiment, the PDCCH 1012 and the uplink channel 1014 are used for communication between a UE and a base station (eNB).

In an exemplary embodiment, the subframe 1010 may also comprise a number of radio resources that can be used for direct vehicle to vehicle (V2V) communication. These resources are generally referred to as "sidelink" resources and may be used to communicate over a "sidelink channel", and are generally referred to using the reference numeral 1016. The sidelink channel 1016 may comprise a number of radio resources including, for example, a physical sidelink control channel (PSCCH) 1022, and a physical sidelink shared channel (PSSCH) 1024. The PSCCH 1022 is a control channel over which control information is communicated and the PSSCH 1024 is a data channel over which data is communicated.

Similarly, in an exemplary embodiment, the subframe 1050 may comprise a 5G physical downlink control channel (PDCCH) 1052 and an uplink channel 1054. In an exemplary embodiment, the PDCCH 1052 and the uplink channel 1054 are used for communication between a UE and a base station (eNB).

In an exemplary embodiment, the subframe 1050 may also comprise a number of sidelink radio resources that can be used for direct vehicle to vehicle (V2V) communication. These "sidelink" resources are generally referred to using the reference numeral 1056. The sidelink channel 1056 may comprise a number of radio resources including, for example, a physical sidelink control channel (PSCCH) 1062, and a physical sidelink shared channel (PSSCH) 1064. The PSCCH 1062 is a control channel over which control information, such as Sidelink Control Information (SCI) messages, are communicated and the PSSCH 1064 is a data channel over which data is communicated. For example the above-mentioned V2X communications may be communicated over the PSSCH 1064.

Figure 11:
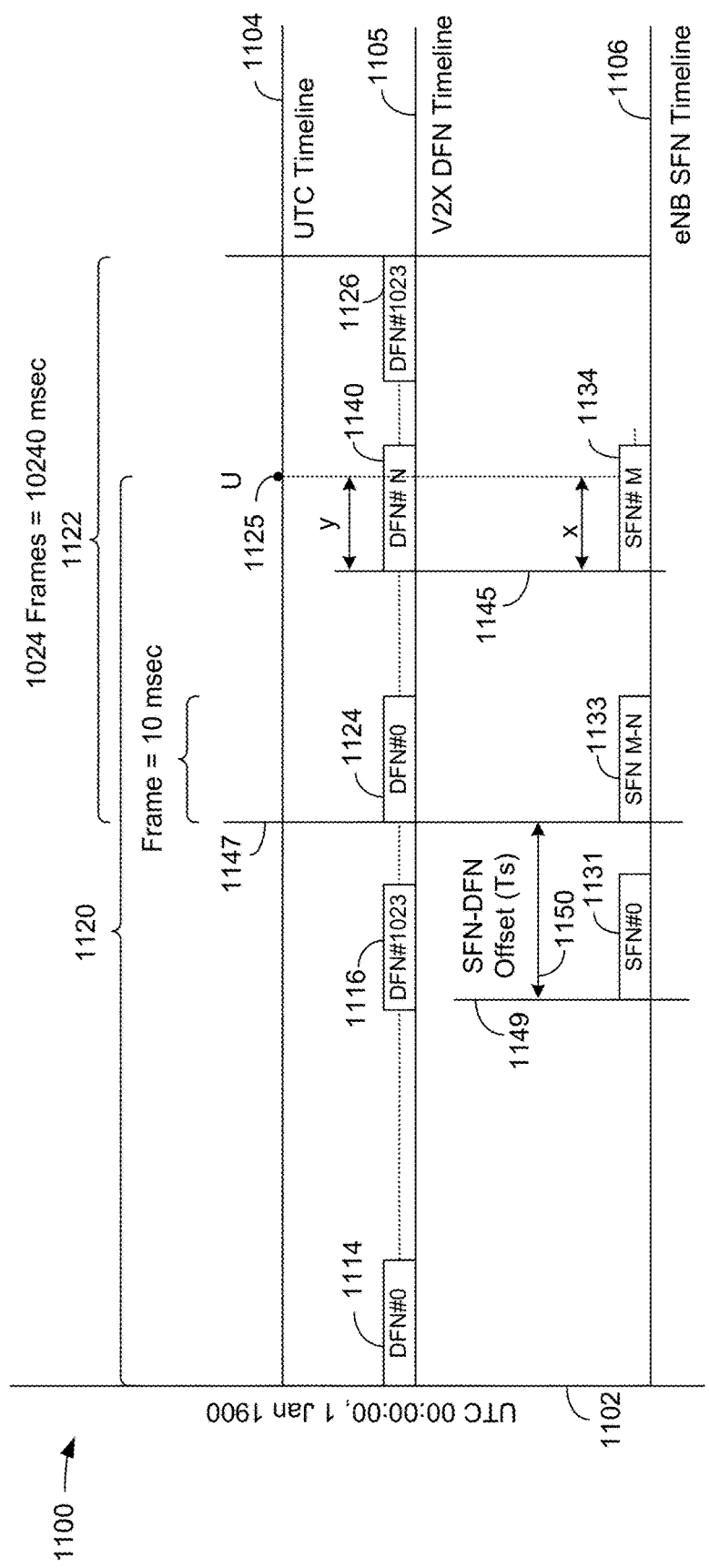
FIG. 11 is a timing diagram showing coordinated universal time (UTC), a UE timeline, and a base station timeline, including SFN-DFN offset.

FIG. 11 is a timing diagram 1100 showing coordinated universal time (UTC), a UE timeline, and a base station timeline, including SFN-DFN offset. The diagram 1100 shows a coordinated universal time (UTC) epoch occurring at midnight on Jan. 1, 1900, on the vertical axis 1102, and shows a UTC timeline on horizontal axis 1104. A UEs V2X direct frame number (DFN) timeline is shown on the V2X DFN timeline 1105, and a base station's (eNB) system frame number (SFN) timeline is shown on the eNB SFN timeline 1106.

In an exemplary embodiment, exemplary DFN frames DFN#0 1114 through DFN#1023 1116 and DFN#0 1124 through DFN#1023 1126 are shown on the V2X DFN timeline 1105. A first time period 1120 represents an arbitrary period of time from the UTC epoch 1102 to the time at which a timing fingerprint may occur. In an exemplary embodiment, the time at which a timing fingerprint may occur is shown as absolute UTC time "U" 1125, and may also be referred to as the "fingerprint time." In an exemplary embodiment, DFN#0 1124 through DFN#1023 1126 are shown as occurring within a first frame period 1122. In an exemplary embodiment, the first frame period 1122 may comprise 1024 communication frames and occupy 10240 milliseconds (ms). In an exemplary embodiment, each frame, exemplary ones being DFN#0 1114 through DFN#1023 1116, and DFN#0 1124 through DFN#1023 1126 may comprise a 10 ms communication frame, and each 10 ms communication frame may comprise ten 1 ms subframes.

On the eNB SFN timeline 1106, exemplary system frames are shown as SFN#0 1131, SFN#M-N 1133 and SFN#M 1134. In an exemplary embodiment, the fingerprint time 1125 corresponds to the same point in time on each of the UTC timeline 1104, the V2X DFN timeline 1105 and the eNB SFN timeline 1106.

In an exemplary embodiment, the frame DFN#N 1140 is offset by "y" Ts from a frame boundary 1145 and the frame SFN#M 1134 is offset by "x" Ts from the frame boundary 1145. The value for the offset "x" Ts and the offset "y" Ts may be in the range of [0, 307200] Ts. In an exemplary embodiment, the period "Ts" refers to the smallest unit of time measured in an LTE communication system. In an exemplary embodiment, Ts=1/(15000×2048) seconds, or approximately 32.58 nanoseconds (ns).

Based on knowing the "y" Ts offset value and the "x" Ts offset value between the fingerprint time 1125 and the frame boundary 1145, the SFN-DFN offset 1150 can be defined as the difference in Ts between V2X DFN#0 1124 and eNB SFN#0 1131. To visualize the SFN-DFN offset 1150, a point in time 1147 may be created by looking back in time from the fingerprint time 1125 by the Ts duration equivalent of N frames plus the offset y Ts. The point 1147 is the last DFN#0 1124 boundary to occur (considering DFN frames rollover every 1024 frames). Similarly on the eNB SFN timeline 1106, the point 1149 represents the last SFN#0 1131 boundary to occur. The difference in Ts between point 1147 and point 1149 is the SFN-DFN offset value 1150 that is stored in the database 663 (FIG. 6) with the timing fingerprint.

In an exemplary embodiment, the SFN-DFN offset 1150 is the difference in Ts between SFN#0 1131 and DFN#0 1124, which may be written as (M*307200+x)−(N*307200+y), where 307200 is a sample duration of one (1) frame in Ts.

In an exemplary embodiment, V2X sidelink communications can use GNSS time to derive reference timing when in network coverage or outside of network coverage. When GNSS time is configured as the synchronization source, a UE uses UTC time to calculate the DFN and subframe number.

In an exemplary embodiment, UTC time (i.e., DFN#0 1114) starts at midnight, 00:00:00 1 Jan. 1900. UTC (time in seconds)=GPS Time (in seconds)+2,524,953,600 (seconds)−leapSeconds. DFN#0 1114 may start after an offset of offsetDFN (not shown). The duration of offsetDFN may be selected to be a number of microseconds, typically between 0~1000 μsec. In an exemplary embodiment, DFN#0 1114 begins after a delay of that number of microseconds (offsetDFN=0~1000 μsec).

V2X DFN=Floor(0.1*$T$current)mod 1024.

V2X Subframe Number=mod($T$current,10).

Tcurrent is the current UTC time in milliseconds.

As used herein, the "Floor" function returns the greatest integer that is less than or equal to the input value, and the "mod" function returns a remainder after dividing a first input by a second input.

When a UE uses GNSS as a synchronization time source for V2X sidelink communications, timing error may be expressed as follows. V2X transmission has a timing threshold of ±12*Ts of GNSS Timing (~391 nanoseconds) per 3GPP, where Ts is the smallest unit of time measured in an LTE system. In an exemplary embodiment, Ts=1/(15000×2048) seconds. V2X reception includes a reasonably tight accuracy of approximately NCP/2 (normal cyclic prefix/2) microseconds, which is more relaxed than for V2X transmission. Timing skew between the transmitter and the receiver is a function of timing error (or uncertainty) at the transmitting UE, timing error (or uncertainty) at the receiving UE, and propagation delay between the transmitting UE and the receiving UE (with some multipath variations).

V2X sidelink communication dictates time synchronization between UEs to demodulate data, and to avoid interference as mentioned herein. GNSS signals rely on accurate knowledge of the locations of the satellites and the transmission times of their signals. Under deep fade scenarios encountered during vehicle operation such as driving through tunnels or urban environments where there can be temporary blockage of the satellite signals and the timing error of any interpolated timing can start to grow at a fast rate. Data sent between UEs should be accurate, even under poor transmit and receive conditions. UEs that cannot handle fading or timing variations will not be able to successfully transmit over a sidelink channel without causing interference, or successfully demodulate the received sidelink signals of other UEs. If timing error exceeds the timing thresholds mentioned herein, V2X transmission and reception functionality may be suspended.

In the past, GNSS transmission and reception functionality may be suspended when the timing error exceeds thresholds mentioned herein, leading to long and frequent V2X service outages. These outages may have an impact on the overall user experience and road safety. Alternatively, the UE may have the ability to support alternative fallback methods for synchronization (sidelink synchronization signals (SLSS) or eNB downlink (DL) timing); however, the following complications exist. SLSS based synchronization is computationally intensive on the receiving UEs as the UE performs synchronization source selection based on primary sidelink synchronization signal/secondary sidelink synchronization signal (PSSS/SSSS) and physical sidelink broadcast channel (PSBCH) demodulation. The UE also routinely reselects synchronization sources upon changes in mobility conditions and the PSSS/SSSS methodology may impact the system capacity.

Base station (eNB, gNB) based synchronization dictates that networks should ensure that they are closely synchronized and have a low timing error. Also, some networks have been upgraded to support system information block (SIB)21 functionality. SIB21 is an addition to LTE that provides an offset value from a serving cell SFN#0 to a DFN boundary, but may not be available in all networks.

In an exemplary embodiment, a computationally simple approach for ensuring robust synchronization for devices where surrounding networks are not necessarily closely synchronized or upgraded to support SIB-21 is disclosed herein.

FIG. 12 is a diagram 1200 showing a timing fingerprint database entry in accordance with various aspects of the present disclosure. The timing fingerprint 1201 comprises columns 1202 showing an entry field, column 1204 showing the size of the entry, column 1206 indicating whether the entry is optional for a timing fingerprint, and a column 1208 showing a description of the entry. In an exemplary embodiment, the timing fingerprint 1201 may be generated by the controller/processor 659 and memory 660, and stored in the database 663 (FIG. 6). Additional timing fingerprints are shown in dotted line.

The timing fingerprint 1201 also comprises rows 1210, with a row 1212 for the synchronization reference source, a row 1214 for the synchronization source priority, a row 1216 for the SFN-DFN offset and a row 1218 for the source time uncertainty. The rows 1210 also comprise a row 1222 for the UTC timestamp, a row 1224 for a local clock timestamp, a row 1226 for the base station cell identifier (eNB cell ID), a row 1228 for the position of the GPS satellite providing the timing synchronization reference, and a row 1232 for the timing advance (TA).

In an exemplary embodiment, the synchronization reference source 1212 may comprise timing and synchronization information including generating or otherwise determining UTC timing provided, for example, by a GNSS source, SIB-21, SIB-16 (UTC timing aligned to SFN boundaries in LTE), SIB-8 with leap seconds, a C2K stack with leap seconds, and using, for example, 1×SRLTE (single radio LTE) type device, or another synchronization reference source that provides or that can generate UTC timing with which a UE may generate a timing fingerprint.

In an exemplary embodiment, the synchronization source priority 1214 may comprise synchronization source priority ordering, such as, for example, timing source (TS) priority (e.g., $TS_1 > TS_2 > TS_3 > \ldots > TS_N$) or alternative orderings created by, for example, a static preconfiguration, a dynamic ordering based on estimated timing accuracy, or other ordering. For example, different timing fingerprint entries may have different synchronization reference sources, and may be assigned different levels of synchronization source priority. For example, when multiple synchronization reference sources are available, a UE may assign each synchronization reference source a priority to determine synchronization source order. A UE can initially use a static priority for various synchronization sources, but can dynamically change this order if the UE detects an accuracy inconsistency with that source. For example, the UE may demote or promote a source based on the source's synchronization source priority.

In an exemplary embodiment, the SFN-DFN offset 1216 may comprise the offset in seconds (Ts) between the base station SFN#0 (for example, SFN#0 1131, FIG. 11) and the GNSS derived UE DFN#0 (for example, DFN#0 1124, FIG. 11).

In an exemplary embodiment, the source time uncertainty 1218 may comprise a value related to the uncertainty of the synchronization source when the SFN-DFN offset is computed.

In an exemplary embodiment, the UTC timestamp 1222 may comprise the timestamp from the synchronization reference source.

In an exemplary embodiment, the local clock timestamp 1224 may comprise the timestamp from a local clock in a UE.

In an exemplary embodiment, the base station cell ID 1226 may comprise the cell identification (ID) of the base station.

In an exemplary embodiment, the GNSS position 1228 may comprise latitude, longitude, and elevation of the GPS satellite providing the GNSS synchronization reference source.

In an exemplary embodiment, the timing advance (TA) 1232 may comprise a timing advance value. In an exemplary embodiment, the timing advance (TA) may be used to counteract signal propagation delay. There are different techniques a UE can use to compute a current timing advance (TA) value. For example, a UE may initiate a random access channel (RACH) communication to a base station to obtain a current TA value. The TA value is a parameter used in calculations when using fingerprinted timing to offset communication signal propagation delay.

The timing fingerprint 1201 may be generated in a variety of ways. For example, the timing fingerprint 1201 may be a static preconfigured entry using the results of a survey that fingerprints timing repeatedly for all cells and external synchronization reference sources supported in a V2X service area. Alternatively, the timing fingerprint 1201 may be generated dynamically as a UE moves through and around a network. In another example, the timing fingerprint 1201 may be generated using oracle-based determination for generating and updating a timing fingerprint. For example, a UE may query a trusted entity, such as, for example, a server or a verified database, to obtain the information used to generate a timing fingerprint.

In an exemplary embodiment, between the time that a timing fingerprint is generated and saved, and the time that a saved timing fingerprint may be used, a base station can reboot, or otherwise experience a timing inconsistency, thus compromising the cached SFN-DFN offset between SFN#0 and DFN#0. In an exemplary embodiment, the UE can determine a possible discontinuous time jump, or other timing inconsistency (e.g. a base station reboot) that may occur before using a timing fingerprint as follows.

In an exemplary embodiment of determining a timing inconsistency, a value referred to as $T_{uncertainty}$ is generated by combining the source time uncertainty from row 1218 above with the current timing uncertainty. If the cumulative $T_{uncertainty}$ during GNSS being in a fade condition is $<\pm 5$ msec during the GNSS fade condition, the DFN of the UE can be calculated using the base station SFN # normalizing for timing advance (TA) differences between the time that the subject timing fingerprint is generated and saved and the current time. In an exemplary embodiment, the timing advance (TA) may be referred to as a correction factor that can be used to normalize a time between when the timing fingerprint was last updated and when the timing fingerprint is applied. This methodology maybe able to determine whether a timing inconsistency, such as a discontinuous time jump, has occurred. However, since the timing error is expected to be within 391 nanoseconds for a transmit signal, the accuracy of this determination should be within such a threshold. For example, when the total timing uncertainty is within +–5 msec then it is possible to detect discontinuous time jumps, or other timing inconsistencies, with SFN timing (e.g., if a base station has rebooted), using the calculations described below in the verification process.

Figure 13A:
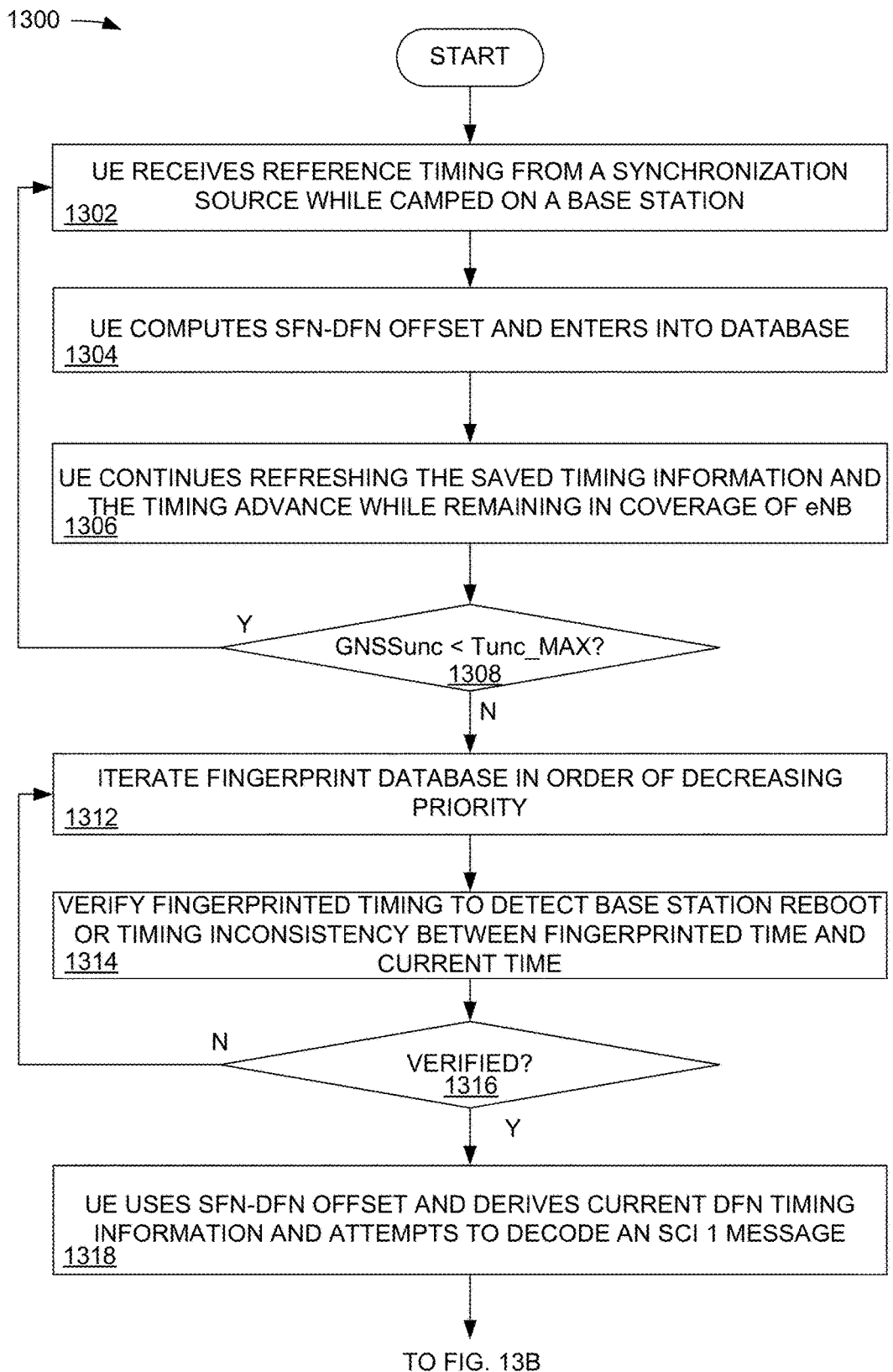
FIGS. 13A and 13B are a flow chart collectively illustrating an example of a method for communication, in accordance with various aspects of the present disclosure.
Figure 13B:
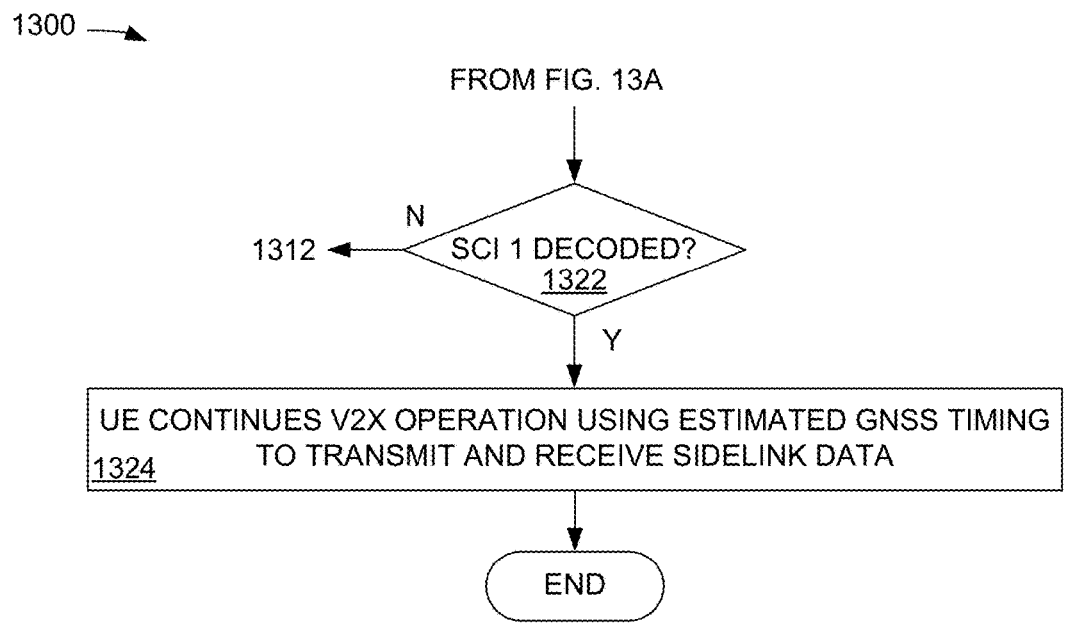

FIGS. 13A and 13B are a flow chart collectively illustrating an example of a method for communication, in accordance with various aspects of the present disclosure. The method 1300 may comprise an exemplary method for synchronizing a communication device for V2V or V2X communication. The blocks in the method 1300 can be performed in or out of the order shown, and in some embodiments, can be performed at least in part in parallel.

In block 1302, a UE, such as a vehicle, receives a signal from a synchronization reference source while being stationed, also referred to as "camped", on a base station. As used herein, the term "camped" refers to a UE being in operative communication with a base station. For example, the UE may receive a GNSS synchronization reference signal from a GPS satellite while being camped on a base station.

In block 1304, a UE, such as a vehicle, computes a SFN-DFN offset and enters that value into a database. For example, a UE 650 may compute the SFN-DFN offset and enter the SFN-DFN offset in row 1216 in the timing fingerprint 1201 in the database 663 (FIG. 6).

In block 1306, the UE, such as a vehicle, continues refreshing the saved timing information and the timing advance (TA) while remaining in coverage of the base station. For example, a UE may initiate a RACH procedure to obtain a current timing advance value. The UE can initiate a RACH procedure during timing fingerprint generation and then periodically update the TA value in row 1232 in the timing fingerprint 1201 in the database 663 (FIG. 6).

In block 1308, it is determined whether the GNSSunc exceeds Tunc_MAX. The term GNSSunc refers to a timing uncertainty associated with the current GPS-provided timing that the UE decodes from a satellite signal. The GNSSunc value is determined based on the quality of the GPS signal, the number of satellites from which the GNSS time is obtained, etc. The term Tunc_MAX refers to the 12*Ts error limit mentioned above. In other words, block 1308 attempts to determine whether the current GNSSunc time exceeds the 12*Ts error limit. For example, based on the current value of GNSS timing uncertainty, a UE may determine if it satisfies a specification requirement to be within the +−12*Ts error limit. If it is determined in block 1308 that the GNSSunc value does not exceed Tunc_MAX, then the process returns to block 1302. If it is determined in block 1308 that the GNSSunc value exceeds Tunc_MAX, then the process proceeds to block 1312. The determination of whether the current GNSSunc time exceeds the 12*Ts error limit may be performed using the controller/processor 659, database 663, and memory 660 of FIG. 6.

In block 1312, the UE iterates the timing fingerprint database in order of decreasing priority, according to the synchronization source priority described above. For example, the database 663 (FIG. 6) may have multiple timing fingerprints with different synchronization sources having different priorities. When a UE determines that it should use fingerprinted timing, the UE starts with the highest priority and iterates to the lowest priority if verification steps fail.

In block 1314, the UE verifies the timing fingerprint to detect a discontinuous time jump, such as a base station reboot, or other timing inconsistency between fingerprinted time and current time, as described herein.

In block 1316, it is determined whether the UE has verified the fingerprinted timing. If in block 1316 it is determined that the UE has not verified the fingerprinted timing, then the process returns to block 1312. If, in block 1316 it is determined that the UE has verified the fingerprinted timing, then the process proceeds to block 1318.

In block 1318, the UE uses the SFN-DFN offset and derives current DFN timing information and attempts to decode a sidelink control information (SCI) 1 message. For example, a UE may derive DFN timing from absolute UTC timing, or may derive DFN timing with knowledge of SFN timing and the SFN-DFN offset.

In block 1322, it is determined whether the UE was able to decode the SCI 1 message. If the UE could not decode the SCI 1 message, the process returns to block 1312. If the UE can decode the SCI 1 message, the process proceeds to block 1324. Successfully decoding the SCI 1 message indicates that the UE may successfully communicate over a sidelink communication channel.

In block 1324, the UE continues V2X communications using the estimated GNSS timing to communicate sidelink data.

Figure 14:
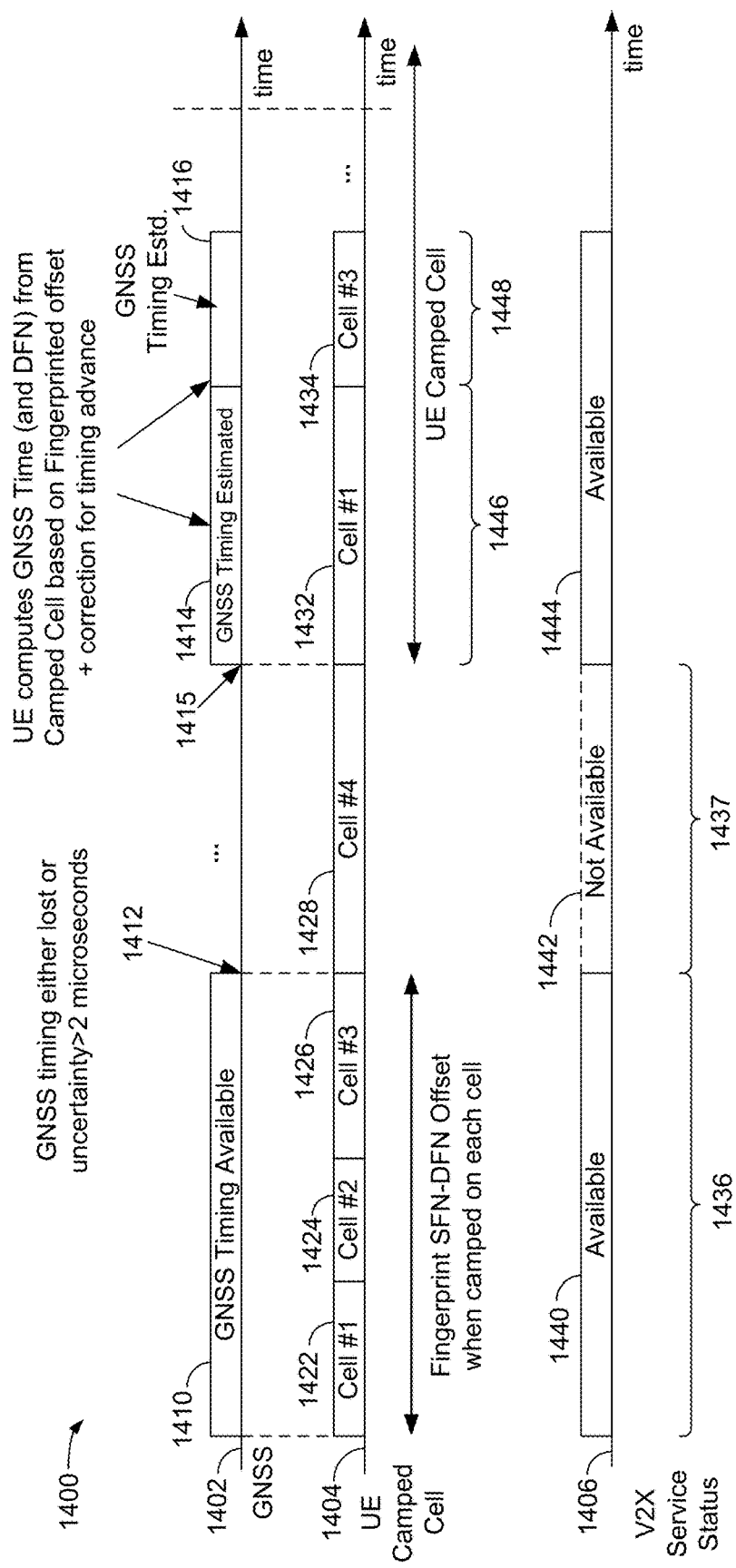
FIG. 14 is a timing diagram showing network timing availability in accordance with various aspects of the present disclosure.

FIG. 14 is a timing diagram 1400 showing network timing availability in accordance with various aspects of the present disclosure. The timing diagram 1400 shows a GNSS timeline 1402, a UE timeline 1404 and a V2X service status timeline 1406. In an exemplary embodiment, the UE timeline 1404 illustrates a single UE moving from cell to cell. However, typically many UEs will be moving from cell to cell. The block 1410 shows GNSS timing being available, up to time 1412, where GNSS timing may either be lost or the timing uncertainty may exceed a threshold such as, for example, two (2) microseconds. During the time 1410, the UE timeline 1404 shows periods of time where the UE is camped on cell #1 1422, where the UE is camped on cell #2 1424 and where the UE is camped on cell #3 1426. During the time 1436, the UE may fingerprint SFN-DFN offset when camped on each cell. The V2X service status timeline 1406 shows V2X communication being available during the time period 1436.

When the UE is camped on cell #4 1428, the V2X service status timeline 1406 shows V2X communication not being available 1442 during the time period 1437 as there is no GNSS timing available.

At time 1415, the GNSS timeline 1402 shows GNSS timing being estimated when the UE is camped on cell #1 1432 during time period 1446, and shows GNSS timing being estimated when the UE is camped on cell #3 1434 during time period 1448. During the time periods 1446 and 1448, the UE computes GNSS time and SFN-DFN offset from a camped cell based on timing fingerprint offset and a correction for timing advance, as described herein. The V2X service status timeline 1406 shows V2X communication being available 1444 during the time periods 1446 and 1448.

Verification of Fingerprinted Offset.

A period of time may elapse between when a timing fingerprint was last updated in the database and when the timing fingerprint is used for synchronization purposes. In such a case, a timing fingerprint may become untrusted, or otherwise stale, such that verification of the timing fingerprint may be performed. Before attempting to decode an SCI 1 message (block 1318 in FIG. 13A), the UE can use the following method to detect whether the base station may have rebooted or if there are any inconsistencies in the timing.

If the UE is still camped on a cell and has current SFN timing then the following condition should be satisfied to consider the cached timing offset still being valid.

$$|((UTC_{now}-UTC_{db})-(SFN_{now}-SFN_{db}))| \leq (Source_{Tunc,now}+Source_{Tunc,db})$$

Where:

$UTC_{now}$ is the current UTC time.

$UTC_{db}$ the UTC time when offset was last saved/updated in the database.

$SFN_{now}$ is the current eNB SFN timing.

$SFN_{db}$ is the eNB SFN timing when the SFN-DFN offset was last saved/updated in the database. The term ($SFN_{now}-SFN_{db}$) may also be referred to as SFN delta.

$Source_{Tunc,now}$ refers to the current timing uncertainty of the synchronization source used to derive UTC timing.

$Source_{Tunc,db}$ refers to the timing uncertainty of the synchronization source used to derive UTC timing when offset was last saved/updated in the database.

Estimating UTC Timing from Fingerprinted Offset Via eNB DL SFN Timing

After a timing fingerprint is verified to still be valid, the UE can use the SFN-DFN$_{offset}$ to derive the current DFN timing to synchronize.

If T time elapses after a timing fingerprint was last updated, then at current time t, the fingerprinted DFN timing is defined as:

$$DFN(t-T)=SFN(t-T)-T_{PropDelay}+DFN_{offset}$$

Where:

DFN(t−T) is the DFN timing at time t when it was last updated T time ago.

SFN(t−T) is the eNB SFN timing at time t when it was last updated T time ago.

$T_{PropDelay}$ is total propagation delay from the sync source, e.g., GNSS, and Timing Advance.

SFN-DFN$_{offset}$ is the offset between base station SFN#0 and derived DFN#0.

At time t, the DFN timing can be derived by:

$$DFN(t)=(SFN(t)-TA(t))+DFN_{offset}$$

Where:

DFN(t) is the current estimated DFN timing.

SFN(t) is the current base station SFN timing.

TA(t) is total Timing Advance.

SFN-DFN$_{offset}$ is the offset between eNB SFN#0 and derived DFN#0 previously saved.

Estimating UTC Timing from Fingerprinted Offset Via Alternative Sources of UTC Timing.

UTC time can be derived from alternative sources when available such as 1x/SIB-8/SIB-16.

Leap Seconds can be provided by GNSS apriori (and are generally very slow changing) if not available from an LTE network.

At time t, the UTC timing can be derived by:

$$UTC(t)=(UTC(t,SIB16)-TA(t))+\Delta_{offset}$$

Where:

UTC(t) is the current estimated UTC timing.

UTC(t,SIB16) is the current UTC timing derived from SIB-16 timing.

TA(t) is total Timing Advance.

$\Delta_{offset}$ set is the timing error between UTC timing derived from SIB-16 and UTC timing derived from GNSS timing (based on fingerprinted data).

Figure 15:
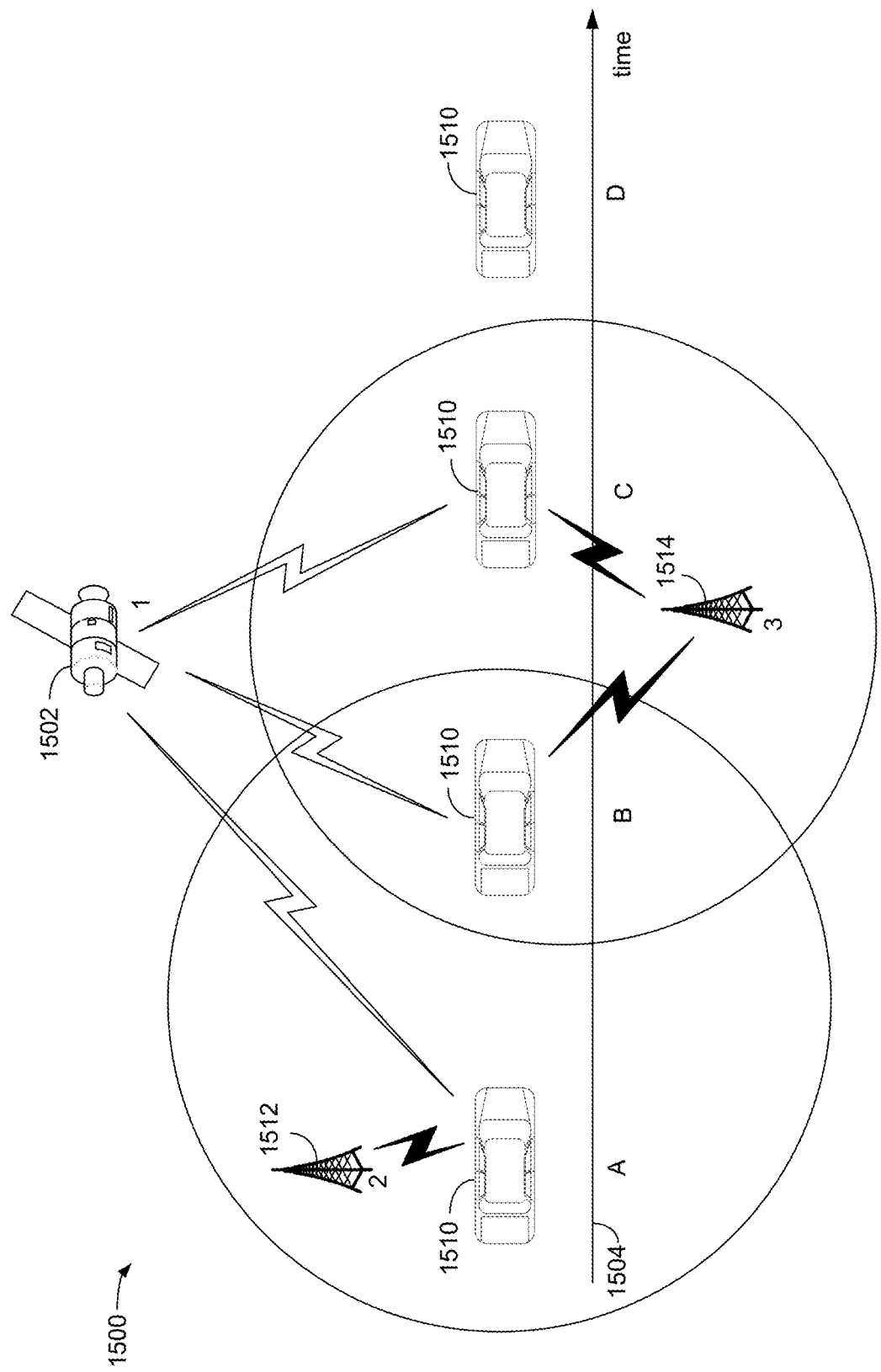
FIG. 15 is a diagram illustrating an example in accordance with various aspects of the present disclosure.

FIG. 15 is a diagram 1500 illustrating an example in accordance with various aspects of the present disclosure. A UE, which in this example may be a vehicle 1510, is shown on a timeline 1504 with time increasing to the right. A satellite 1502 may provide a GNSS synchronization reference signal, and base stations 1512 and 1514 may be in constant or periodic communication with the vehicle 1510.

In an exemplary embodiment, a UE, the vehicle 1510, is receiving GNSS timing with an error below the transmit timing error limit (12*Ts) mentioned herein from the satellite 1502.

At timestamp A, the vehicle 1510 acquires the base station 1512 and receives no SIBs providing timing information. GNSS timing is still within the error limit and the vehicle 1510 calculates the offset between SFN#0 and GNSS derived DFN#0 (i.e., the SFN-DFN offset 1150 of FIG. 11). The vehicle 1510 performs a RACH (random access channel) procedure to obtain timing advance (TA) information, such that one new timing fingerprint entry (1201 of FIG. 12) is added to the database 663 (FIG. 6).

Between timestamp A and B, the vehicle 1510 periodically refreshes the fingerprinted offset, that is, the SFN-DFN offset 1150 (FIG. 11), and TA values accounting for time drifts.

At timestamp B, the vehicle 1510 moves and acquires base station 1514 and receives a SIB-16 communication. GNSS timing is within the error limit and the vehicle 1510 calculates the offset between SFN#0 and GNSS derived DFN#0, and between SFN#0 and SIB-16 derived DFN#0. The vehicle 1510 forces a RACH procedure to get TA information. Two new timing fingerprint 1201 (FIG. 12) entries are added to the database 663 (FIG. 6), one timing fingerprint based on GNSS as the synchronization reference source, and one timing fingerprint based on the SIB-16 synchronization reference source.

Between timestamp B and C, the vehicle 1510 periodically refreshes the fingerprinted SFN-DFN offsets and TA values accounting for time drifts.

At timestamp C, the vehicle 1510 is still camped on base station 1514 and now GNSS timing error exceeds the transmit timing limit. The vehicle 1510 searches the timing fingerprints 1201 in the database 663 before suspending V2X transmission and reception. The vehicle 1510 iterates the timing fingerprints 1201 (FIG. 12) in the database 663 (FIG. 6) in order of decreasing priority. For entries with the same base station the vehicle 1510 first validates the timing fingerprint to detect for base station reboots or a timing inconsistency from when the timing fingerprint was last refreshed.

Using a reference, such as a local clock or GPS timing, the vehicle 1510 compares the time delta between the reference (local clock or GPS timing) and the SFN delta. If the SFN delta is within the sum of the total uncertainty then it can be assumed that there was no base station reboot and timing is valid. The vehicle 1510 attempts to decode a format 1 SCI message using the timing and if successful continues V2X operations. Otherwise the vehicle 1510 tries to establish timing with the next ranked synchronization source in the database 663 (FIG. 6).

At timestamp D, the vehicle 1510 is out-of-coverage from both GNSS and the base station. The vehicle 1510 may use a current local clock and cached local clock time plus cached SFN to derive current SFN timing.

In an exemplary embodiment, the techniques for establishing and maintaining timing synchronization and synchronization source selection for vehicle-to-vehicle and vehicle-to-everything communications described herein are computationally simple and are thereby scalable. A communication network need not be upgraded to support SIB-21, and V2X Sidelink service outages are minimized. The techniques described herein may be more accurate than using SLSS, which has a timing error allowance of ±24*Ts of GNSS Timing (~782 nanoseconds), rather than the timing threshold of ±12*Ts of GNSS Timing (~391 nanoseconds), as do the techniques for establishing and maintaining timing synchronization and synchronization source selection for vehicle-to-vehicle communications described herein.

Figure 16:
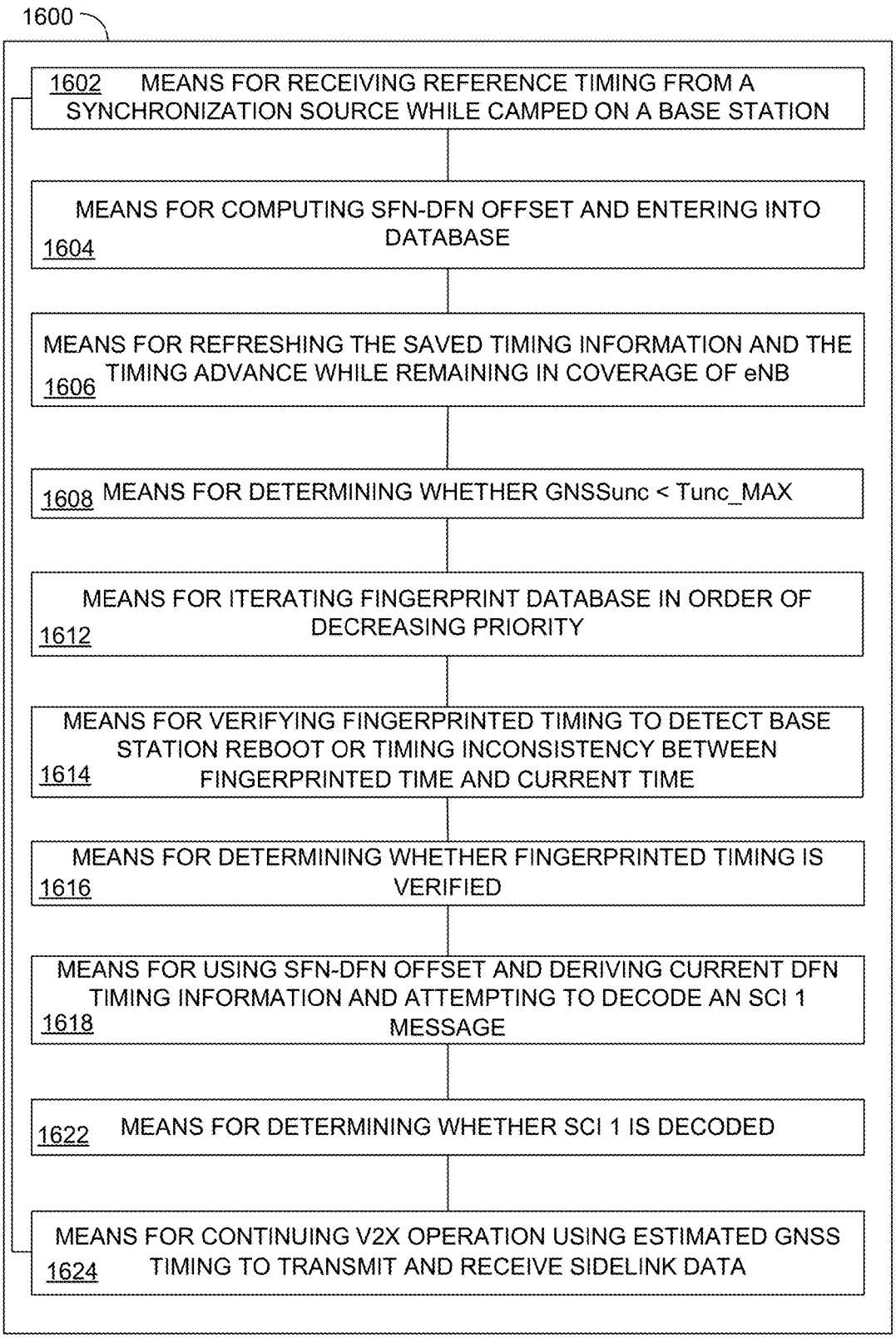
FIG. 16 is a functional block diagram of an apparatus for a communication system in accordance with various aspects of the present disclosure.

FIG. 16 is a functional block diagram of an apparatus 1600 for a communication system in accordance with various aspects of the present disclosure. The apparatus 1600 comprises means 1602 for receiving a signal from a synchronization reference source while being stationed, also referred to as "camped", on a base station. In certain embodiments, the means 1602 for receiving a signal from a synchronization reference source while being stationed, also referred to as camped, on a base station can be configured to perform one or more of the function described in operation block 1302 of method 1300 (FIG. 13A). In an exemplary embodiment, the means 1602 for receiving a signal from a synchronization reference source while being stationed, also referred to as "camped", on a base station may comprise a UE 650 (FIG. 6) receiving a synchronization signal while be camped on a base station 610 (FIG. 6).

The apparatus 1600 further comprises means 1604 for computing an SFN-DFN offset and entering that value into a database. In certain embodiments, the means 1604 for computing an SFN-DFN offset and entering that value into a database can be configured to perform one or more of the function described in operation block 1304 of method 1300 (FIG. 13A). In an exemplary embodiment, the means 1604 for computing an SFN-DFN offset and entering that value into a database may comprise the UE 650 (FIG. 6) computing the SFN-DFN offset and entering the SFN-DFN offset in the timing fingerprint 1201 (FIG. 12) in the database 663 (FIG. 6).

The apparatus 1600 further comprises means 1606 for refreshing the saved timing information and the timing advance (TA) while remaining in coverage of the base station. In certain embodiments, the means 1606 for refreshing the saved timing information and the timing advance (TA) while remaining in coverage of the base station can be configured to perform one or more of the function described in operation block 1306 of method 1300 (FIG. 13A). In an exemplary embodiment, the means 1606 for refreshing the saved timing information and the timing advance (TA) while remaining in coverage of the base station may comprise the UE 650 (FIG. 6) initiating a RACH procedure to obtain a current timing advance value, and entering the refreshed timing fingerprint and TA value in the database 663 (FIG. 6).

The apparatus 1600 further comprises means 1608 for determining whether GNSSunc exceeds Tunc_MAX. In certain embodiments, the means 1608 for determining whether GNSSunc exceeds Tunc_MAX can be configured to perform one or more of the function described in operation block 1308 of method 1300 (FIG. 13A). In an exemplary embodiment, the means 1608 for determining whether GNSSunc exceeds Tunc_MAX may comprise the UE 650 (FIG. 6) determining whether GNSSunc exceeds a 12*Ts error limit.

The apparatus 1600 further comprises means 1612 for iterating the timing fingerprint database in order of decreasing priority. In certain embodiments, the means 1612 for iterating the timing fingerprint database in order of decreasing priority can be configured to perform one or more of the function described in operation block 1312 of method 1300 (FIG. 13A). In an exemplary embodiment, the means 1612 for iterating the timing fingerprint database in order of decreasing priority may comprise the UE 650 (FIG. 6) iterating multiple timing fingerprints having different synchronization sources with different priorities in the database 663 (FIG. 6) if a timing fingerprint is not verified.

The apparatus 1600 further comprises means 1614 for verifying the timing fingerprint to detect a timing inconsistency, such as a base station reboot, between fingerprinted time and current time. In certain embodiments, the means 1614 for verifying the timing fingerprint to detect a timing inconsistency, such as a base station reboot, between fingerprinted time and current time can be configured to perform one or more of the function described in operation block 1314 of method 1300 (FIG. 13A). In an exemplary embodiment, the means 1614 for verifying the timing fingerprint to detect a timing inconsistency, such as a base station reboot, between fingerprinted time and current time may comprise the UE 650 (FIG. 6) verifying a timing fingerprint in the database 663 (FIG. 6.

The apparatus 1600 further comprises means 1616 for determining whether the UE has verified the fingerprinted timing. In certain embodiments, the means 1616 for determining whether the UE has verified the fingerprinted timing can be configured to perform one or more of the function described in operation block 1316 of method 1300 (FIG. 13A). In an exemplary embodiment, the means 1616 for determining whether the UE has verified the fingerprinted timing may comprise the UE 650 (FIG. 6) determining whether a timing fingerprint in the database 663 (FIG. 6) is verified.

The apparatus 1600 further comprises means 1618 for using the SFN-DFN offset, deriving current DFN timing information and attempting to decode a sidelink control information (SCI) 1 message. In certain embodiments, the means 1618 for using the SFN-DFN offset, deriving current DFN timing information and attempting to decode a sidelink control information (SCI) 1 message can be configured to perform one or more of the function described in operation block 1318 of method 1300 (FIG. 13A). In an exemplary embodiment, the means 1618 for using the SFN-DFN offset, deriving current DFN timing information and attempting to decode a sidelink control information (SCI) 1 message may comprise the UE 650 (FIG. 6) using the SFN-DFN offset to derive current DFN timing information and attempting to decode an SCI 1 message.

The apparatus 1600 further comprises means 1622 for determining whether the SCI 1 message has been decoded. In certain embodiments, the means 1622 for determining whether the SCI 1 message has been decoded can be configured to perform one or more of the function described in operation block 1322 of method 1300 (FIG. 13A). In an exemplary embodiment, the means 1622 for determining whether the SCI 1 message has been decoded may comprise the UE 650 (FIG. 6) determining whether it has successfully decoded an SCI 1 message.

The apparatus 1600 further comprises means 1624 for continuing V2X communications using the estimated GNSS timing to communicate sidelink data. In certain embodiments, the means 1624 for continuing V2X communications using the estimated GNSS timing to communicate sidelink data can be configured to perform one or more of the function described in operation block 1324 of method 1300 (FIG. 13A). In an exemplary embodiment, the means 1624 for continuing V2X communications using the estimated GNSS timing to communicate sidelink data may comprise the UE 650 (FIG. 6) successfully communication over a sidelink communication channel.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for synchronizing a communication device, comprising:
    obtaining a timing signal from a timing synchronization reference source;
    computing a system frame number (SFN)-direct frame number (DFN) offset;
    creating a timing fingerprint using the timing signal and the SFN-DFN offset, the timing fingerprint also comprising additional timing information;
    entering the timing fingerprint into a database;
    continually updating the timing fingerprint;
    determining whether the timing signal remains within a threshold;
    if the timing signal exceeds the threshold, iterating the timing fingerprint;
    verifying the timing fingerprint to determine whether there is a timing inconsistency between a most recent timing fingerprint and current time;
    if the timing fingerprint is verified, using the SFN-DFN offset to derive current DFN timing to decode a sidelink control information (SCI) communication; and
    if the SCI communication is decoded, using the timing signal for communicating over a sidelink communication channel.

2. The method of claim 1, wherein the timing synchronization reference source provides a GNSS timing synchronization signal.

3. The method of claim 1, wherein the SFN-DFN offset comprises an offset in Ts between a base station's SFN #0 and a GNSS derived DFN #0.

4. The method of claim 1, wherein a user equipment (UE) determines if the timing inconsistency occurs before using the timing fingerprint.

5. The method of claim 1, further comprising applying a correction factor to normalize a time between when the timing fingerprint was last updated and when the timing fingerprint is applied.

6. The method of claim 1, wherein the timing fingerprint having the timing signal and the SFN-DFN offset is obtained from a server.

7. The method of claim 1, wherein the timing fingerprint further comprises a source time uncertainty, a UTC (coordinated universal time) timestamp, and a base station cell identification (ID).

8. The method of claim 7, wherein the timing fingerprint further comprises one or more of a synchronization source priority identifier, a local clock timestamp, a GNSS position, and a timing advance (TA).

9. The method of claim 8, wherein the synchronization source priority identifier comprises synchronization source priority ordering of one or more of timing source (TS) priority, static preconfiguration, and dynamic ordering based on estimated timing accuracy.

10. An apparatus for communication, comprising:
    a user equipment (UE) configured to obtain a timing signal from a timing synchronization reference source;
    the UE configured to compute a system frame number (SFN)-direct frame number (DFN) offset;
    the UE configured to create a timing fingerprint using the timing signal and the SFN-DFN offset, the timing fingerprint also comprising additional timing information;
    a database configured to store the timing fingerprint;
    the UE configured to continually update the timing fingerprint;
    the UE configured to determine whether the timing signal remains within a threshold;
    if the timing signal exceeds the threshold, the UE configured to iterate the timing fingerprint;
    the UE configured to verify the timing fingerprint to determine whether there is a timing inconsistency between a most recent timing fingerprint and current time;
    if the timing fingerprint is verified, the UE configured to use the SFN-DFN offset to derive current DFN timing to decode a sidelink control information (SCI) communication; and
    if the SCI communication is decoded, the UE configured to use the timing signal for communicating over a sidelink communication channel.

11. The apparatus of claim 10, wherein the timing synchronization reference source provides a GNSS timing synchronization signal.

12. The apparatus of claim 10, wherein the SFN-DFN offset comprises an offset in Ts between a base station's SFN #0 and a GNSS derived DFN #0.

13. The apparatus of claim 10, wherein a user equipment (UE) determines if the timing inconsistency occurs before using the timing fingerprint.

14. The apparatus of claim 10, further comprising applying a correction factor to normalize a time between when the timing fingerprint was last updated and when the timing fingerprint is applied.

15. The apparatus of claim 10, wherein the timing fingerprint having the timing signal and the SFN-DFN offset is obtained from a server.

16. The apparatus of claim 10, wherein the timing fingerprint further comprises a source time uncertainty, a UTC (coordinated universal time) timestamp, and a base station cell identification (ID).

17. The apparatus of claim 16, wherein the timing fingerprint further comprises one or more of a synchronization source priority identifier, a local clock timestamp, a GNSS position, and a timing advance (TA).

18. The apparatus of claim 17, wherein the synchronization source priority identifier comprises synchronization source priority ordering of one or more of timing source (TS) priority, static preconfiguration, and dynamic ordering based on estimated timing accuracy.

19. A device, comprising:
    means for obtaining a timing signal from a timing synchronization reference source;
    means for computing a system frame number (SFN)-direct frame number (DFN) offset;
    means for creating a timing fingerprint using the timing signal and the SFN-DFN offset, the timing fingerprint also comprising additional timing information;
    means for entering the timing fingerprint into a database;
    means for continually updating the timing fingerprint;

means for determining whether the timing signal remains within a threshold;

if the timing signal exceeds the threshold, means for iterating the timing fingerprint;

means for verifying the timing fingerprint to determine whether there is a timing inconsistency between a most recent timing fingerprint and current time;

if the timing fingerprint is verified, means for using the SFN-DFN offset to derive current DFN timing to decode a sidelink control information (SCI) communication; and if the SCI communication is decoded, means for using the timing signal for communicating over a sidelink communication channel.

20. The device of claim 19, wherein the timing synchronization reference source provides a GNSS timing synchronization signal.

21. The device of claim 20, wherein the SFN-DFN offset comprises an offset in Ts between a base station's SFN #0 and a GNSS derived DFN #0.

22. The device of claim 19, wherein a user equipment (UE) determines if the timing inconsistency occurs before using the timing fingerprint.

23. The device of claim 19, further comprising means for applying a correction factor to normalize a time between when the timing fingerprint was last updated and when the timing fingerprint is applied.

24. The device of claim 19, wherein the timing fingerprint having the timing signal and the SFN-DFN offset is obtained from a server.

25. The device of claim 19, wherein the timing fingerprint further comprises a source time uncertainty, a UTC (coordinated universal time) timestamp, and a base station cell identification (ID).

26. The device of claim 25, wherein the timing fingerprint further comprises one or more of a synchronization source priority identifier, a local clock timestamp, a GNSS position, and a timing advance (TA).

27. The device of claim 26, wherein the synchronization source priority identifier comprises synchronization source priority ordering of one or more of timing source (TS) priority, static preconfiguration, and dynamic ordering based on estimated timing accuracy.

28. A non-transitory computer-readable medium storing computer executable code for communication, the code executable by a processor to:

obtain a timing signal from a timing synchronization reference source;

compute a system frame number (SFN)-direct frame number (DFN) offset;

create a timing fingerprint using the timing signal and the SFN-DFN offset, the timing fingerprint also comprising additional timing information;

enter the timing fingerprint into a database;

continually update the timing fingerprint;

determine whether the timing signal remains within a threshold;

if the timing signal exceeds the threshold, iterate the timing fingerprint;

verify the timing fingerprint to determine whether there is a timing inconsistency between a most recent timing fingerprint and current time;

if the timing fingerprint is verified, use the SFN-DFN offset to derive current DFN timing to decode a sidelink control information (SCI) communication; and if the SCI communication is decoded, use the timing signal for communicating over a sidelink communication channel.

29. The non-transitory computer-readable medium of claim 28, the code executable by a processor to determine if the timing inconsistency occurs before using the timing fingerprint.

30. The non-transitory computer-readable medium of claim 28, wherein the code is executable by a processor to:

apply a correction factor to normalize a time between when the timing fingerprint was last updated and when the timing fingerprint is applied.

* * * * *